(12) United States Patent
Chung

(10) Patent No.: US 11,670,794 B2
(45) Date of Patent: Jun. 6, 2023

(54) SECONDARY BATTERY MANUFACTURING EQUIPMENT AND SECONDARY BATTERY MANUFACTURING METHOD USING SAME

(71) Applicant: YOUILET CO., LTD., Gyeonggi-do (KR)

(72) Inventor: Youn Gil Chung, Gyeonggi-do (KR)

(73) Assignee: YOUILET CO., LTD., Gyeonggi-do (KR)

( * ) Notice: Subject to any disclaimer, the term of this patent is extended or adjusted under 35 U.S.C. 154(b) by 150 days.

(21) Appl. No.: 17/263,653

(22) PCT Filed: Jan. 10, 2019

(86) PCT No.: PCT/KR2019/000391
§ 371 (c)(1),
(2) Date: Jan. 27, 2021

(87) PCT Pub. No.: WO2020/027395
PCT Pub. Date: Feb. 6, 2020

(65) Prior Publication Data
US 2021/0296679 A1    Sep. 23, 2021

(30) Foreign Application Priority Data
Aug. 1, 2018  (KR) .................. 10-2018-0090073

(51) Int. Cl.
*H01M 10/04*  (2006.01)
*H01M 10/0583*  (2010.01)

(52) U.S. Cl.
CPC ... *H01M 10/0404* (2013.01); *H01M 10/0459* (2013.01); *H01M 10/0583* (2013.01)

(58) Field of Classification Search
CPC ......... H01M 10/0404; H01M 10/0459; H01M 10/0583; H01M 10/0413; H01M 10/0436;
(Continued)

(56) References Cited

U.S. PATENT DOCUMENTS 8,845,839 B2 * 9/2014 Yuhara .............. H01M 10/0413
156/228

FOREIGN PATENT DOCUMENTS

JP    2011-204552 A    10/2011
JP    2012-221715 A    11/2012
(Continued)

OTHER PUBLICATIONS

Machine translation of KR 101319004 B1(Year: 2013).*
(Continued)

*Primary Examiner* — Matthew T Martin
*Assistant Examiner* — Unique Jenevieve Luna
(74) *Attorney, Agent, or Firm* — Harness, Dickey & Pierce, P.L.C.

(57) ABSTRACT

A secondary battery manufacturing equipment comprises: a main body unit; a pair of electrode plate loading units, disposed in the main body unit to face each other, for supplying electrode plates of different polarities; an electrode plate transfer unit for transferring the electrode plates of different polarities, supplied from the pair of electrode plate loading units, to a set stacking position in an intersecting manner; a stacking unit installed in the main body unit to be disposed at the stacking position for horizontally reciprocating within a first distance range which is set as the electrode plates are transferred in an intersecting manner; a separator supply unit installed in the main body so as to be disposed above the stacking unit for horizontally reciprocating within a second distance range which is set such that a separator is interposed between the electrode plates that are transferred in an intersecting manner.

19 Claims, 15 Drawing Sheets

(58) Field of Classification Search
CPC ......... H01M 10/0463; H01M 10/0525; H01M 10/0585; H01M 50/463–469; H01M 10/05
See application file for complete search history.

(56) References Cited

FOREIGN PATENT DOCUMENTS

| | | | |
|---|---|---|---|
| KR | 10-2003-0055435 A | | 7/2003 |
| KR | 10-2011-0048839 A | | 5/2011 |
| KR | 10-2012-0078824 A | | 7/2012 |
| KR | 10-2014-0142524 A | | 12/2014 |
| KR | 20150111551 A | * | 10/2015 |
| KR | 10-2016-0138741 A | | 12/2016 |
| KR | 10-2017-0114904 A | | 10/2017 |

OTHER PUBLICATIONS

Machine translation of KR 20150111551 A (Year: 2015).*
International Search Report from corresponding PCT Application No. PCT/KR2019/000391, dated May 1, 2019.

* cited by examiner

SECONDARY BATTERY MANUFACTURING EQUIPMENT AND SECONDARY BATTERY MANUFACTURING METHOD USING SAME

CROSS-REFERENCE TO RELATED APPLICATIONS

This application is a national phase application of PCT Application No. PCT/KR2019/000391, filed on Jan. 10, 2019, which claims the benefit of and priority to Korean Patent Application No. 10-2018-0090073, filed Aug. 1, 2018. The entire disclosures of the applications identified in this paragraph are incorporated herein by references.

TECHNICAL FIELD

The present invention relates to secondary battery manufacturing equipment and a secondary battery manufacturing method using the same.

BACKGROUND ART

In general, a process of manufacturing a lithium battery includes a process of stacking a separator between positive electrode plates and negative electrode plates.

In Korean Patent Application No. 10-2003-0055435 (hereinafter referred to as "prior art document 1"), an example of a method of manufacturing a cell is disclosed.

The prior art document 1 provides a technique of repeatedly stacking a separator between positive electrode plates and negative electrode plates. The above technique is for continuously stacking and aligning a separator between positive electrode plates and negative electrode plates.

In addition, in Korean Laid-Open Patent Publication No. 10-2014-0142524 (hereinafter referred to as "prior art document 2"), a stacking device of a lithium battery is disclosed.

The stacking device disclosed in the prior art document 2 includes a separator moving unit configured to move a separator, an electrode plate aligning unit configured to align a first electrode plate on the separator at a specific interval, a separator movement control unit configured to control the movement of the separator moving unit such that the specific interval becomes long enough for one electrode plate to be placed, and an electrode plate inserting unit configured to fold the separator at a specific interval and at the same time insert and align a second electrode plate on a side of the separator opposite to the side where the first electrode plate is aligned.

The separator moving unit moves a separator. Also, the first electrode plates are supplied to the separator moving unit and the separator moving unit aligns the first electrode plates on an upper surface of a moving separator and continuously moves the separator.

The separator on which the first electrode plate is aligned is moved downward from an end of the separator moving unit. The electrode plate inserting unit inserts the second electrode plate along the lateral side of the separator so that the second electrode plate is fitted into the other surface of the separator. Accordingly, the second electrode plate is aligned on the other surface of the separator where the first electrode plate is not aligned. Thus, the separator is interposed between the first electrode plate and the second electrode plate.

In this case, the separator is linearly moved by the separator moving unit, such as a transfer rail. In addition, the separator linearly moved is moved downward. The separator while in motion downward is in physical contact with one end of the second electrode plate that is linearly moved from the lateral side of the separator. At this time, the separator may not be in close contact with a lateral side of one end of the second electrode plate that is moved laterally. Accordingly, the separator may be damaged.

In addition, as described above, the configuration in which the second electrode plates are sequentially stacked on the first electrode plate with the separator interposed therebetween by one electrode plate insertion unit deleteriously increases the time required to manufacture one secondary battery, thereby lowering the productivity.

In addition, in the process of moving the separator downward with the first electrode plate aligned beforehand on one surface thereof, the first electrode plate may be separated from and dislodged from the one surface of the separator.

Further, since the mechanism for supplying the first electrode plate and the mechanism for supplying the second electrode plate form different processes, the first electrode plate and the second electrode plate may not be normally aligned.

Moreover, since the electrode plate aligning unit for supplying the first electrode plate and the electrode inserting unit for supplying the second electrode plate are disposed at different positions in a vertical direction, the corresponding electrode plate or an electrode plate may not be stably supplied or moved to a stacking position.

In addition, since the position where the first electrode is supplied and the position where the second electrode is supplied are not symmetrical to each other, the size of the stacking device itself is disadvantageously increased.

Accordingly, in recent years, there is a need to develop a technology capable of improving productivity of a secondary battery and solving structural defects in which a separator is lifted from lateral side regions of electrode plates having different polarities.

In addition, there is a need to develop a technology capable of preventing process failures in which electrode plates of different polarities stacked in an intersecting manner are misaligned.

Prior art document 3 related to the present invention is Korean Laid-Open Patent Publication No. 10-2011-0048839. The above prior art document 3 discloses a method of manufacturing a secondary battery including the steps of aligning and stacking a first electrode plate, a first separator, a second separator, and a second electrode plate and taping the aligned and stacked first electrode plate, first separator, second separator, and second electrode plate at an outermost side thereof.

In the step of aligning the first and second electrode plates mentioned in the prior art document, separate cleaning is not performed during the transfer of the first and second electrode plates, and thus foreign substances may be aligned on the first and second electrode plates. Accordingly, there is a problem in that product defects occur due to the foreign substances interposed between the first and second electrode plates and the separators.

In addition, the separators form a zigzag structure, which is interposed between each electrode plate and the adjacent electrode plate. However, this arrangement also has a problem in that structural defects in which the separators are lifted from the lateral side regions of the electrode plates having different polarities.

SUMMARY

Technical Problem

A first objective of the present invention is to provide secondary battery manufacturing equipment capable of increasing the productivity of electrodes and reducing the size of equipment by supplying electrode plates of different polarities positioned in symmetrical positions to a stacking position in an intersecting manner and interposing a separator between the electrode plates, and a secondary battery manufacturing method using the same.

In addition, a second objective of the present invention is to provide secondary battery manufacturing equipment capable of easily aligning a separator on an upper surface of an electrode plate by moving the corresponding electrode plate and the separator such that they are movable together in a horizontal direction, and a secondary battery manufacturing method using the same.

In addition, a third objective of the present invention is to provide secondary battery manufacturing equipment capable of preventing the separator from being unaligned on a lateral side of one side of an electrode plate by forming a predetermined tension in the separator on the lateral side of the electrode plate, and a secondary battery manufacturing method using the same.

In addition, a fourth objective of the present invention is to provide secondary battery manufacturing equipment capable of preventing the formation of foreign substances on an electrode plate before the stacking process by cleaning the corresponding electrode plate while being supplied to the stacking position, and a secondary battery manufacturing method using the same.

Further, a fifth objective of the present invention is to provide secondary battery manufacturing equipment capable of preventing product defects from occurring due to misalignment through real-time monitoring of the alignment of electrode plates moved to the stacking position, and a secondary battery manufacturing method using the same.

Technical Solution

In order to achieve the above objectives, the present invention provides secondary battery manufacturing equipment.

A secondary battery manufacturing equipment according to the present invention includes a main body unit; a pair of electrode plate loading units, disposed in the main body unit to face each other, for supplying electrode plates of different polarities; an electrode plate transfer unit for transferring the electrode plates of different polarities, supplied from the pair of electrode plate loading units, to a set stacking position in an intersecting manner; a stacking unit installed in the main body unit to be disposed at the stacking position for horizontally reciprocating within a first distance range which is set as the electrode plates are transferred in an intersecting manner; a separator supply unit installed in the main body so as to be disposed above the stacking unit for horizontally reciprocating within a second distance range which is set such that a separator is interposed between the electrode plates that are transferred in an intersecting manner; and a control unit for controlling driving of the pair of electrode plate loading units, the electrode plate transfer unit, the stacking unit, and the separator supply unit.

It is preferable that the pair of electrode plate loading units includes a first loading unit and a second loading unit disposed at a position symmetrical to the first loading portion, wherein the first loading unit includes a first magazine in which positive electrode plates are accommodated and a first transfer unit for sequentially transferring the positive electrode plates from the first magazine to a first transfer position, and the second loading unit includes a second magazine in which the negative electrode plates are accommodated and a second transfer unit for sequentially transferring the negative electrode plates from the second magazine to a second transfer position.

It is preferable that the first transfer unit includes a first linear transfer unit disposed apart from the first magazine and a first rotation transfer unit disposed above and between the first magazine and the first linear transfer unit, wherein the first rotation transfer unit includes a first rotation transfer unit body, a first rotation module installed in the first rotation transfer unit body and having a first rotary shaft along a vertical direction, a first rotating plate installed on the first rotary shaft and rotated about the first rotary shaft, a plurality of first grip members disposed at intervals along a periphery of the first rotating plate for sequentially griping the positive electrode plates as they are rotated a predetermined angle, and a first elevator installed in the main body unit and configured to move the first rotation transfer unit body upward and downward, the first linear transfer unit includes a first conveyor belt that rotates continuously, a pair of first driving rollers that rotatably support both ends of the first conveyor belt, and a first module that rotates the pair of first driving rollers 132, the plurality of first grip members sequentially grip the positive electrode plates from the first magazine and transfer them to one end upstream of the first conveyor belt, the first conveyor belt horizontally moves the sequentially transferred positive electrode plates 10 to the first transfer position, the second transfer unit includes a second linear transfer unit disposed apart from the second magazine and a second rotation transfer unit disposed above and between the second magazine and the second linear transfer unit, the second rotation transfer unit includes a second rotation transfer unit body, a second rotation module installed on the second rotation transfer unit body and having a second rotary shaft along a vertical direction, a second rotating plate installed on the second rotary shaft and rotated about the second rotary shaft, a plurality of second grip members disposed at intervals along a periphery of the second rotating plate and configured to sequentially grip the negative electrode plates as they are rotated a predetermined angle, and a second elevator installed in the main body unit and configured to move the second rotation transfer unit body upward and downward, the second linear transfer unit includes a second conveyor belt that rotates continuously, a pair of second driving rollers that rotatably support both ends of the second conveyor belt, and a second module that rotates the pair of second driving rollers, The plurality of second grip members sequentially grip the negative electrode plates from the second magazine and transfer them to one end upstream of the second conveyor belt, the second conveyor belt horizontally moves the sequentially transferred negative electrode plates to the second transfer position, and there is a predetermined time difference between the time of transfer of the positive electrode plates to the first transfer position and the time of transfer of the negative electrode plates to the second transfer position.

It is preferable that the electrode plate transfer unit includes a first electrode plate transfer unit that sequentially picks up and rotates the positive electrode plates transferred to the first transfer position and a second electrode plate transfer unit that sequentially picks up and rotates the negative electrode plates transferred to the second transfer position in such a manner that the predetermined time difference is maintained.

It is preferable that a rotation angle range of the first electrode plate transfer unit and the second electrode plate transfer unit is set to 180 degrees.

It is preferable that the first electrode plate transfer unit includes a first transfer arm formed in a vertically inverted "L" shape and forming a first central shaft, a pair of first grippers installed on both ends of the first transfer arm for sequentially picking up the positive electrode plates transferred to the first transfer position and transferring them to the stacking position, and a first rotator connected to the first central shaft for repeatedly rotating the first transfer arm within a rotation range of 180 degrees under the control of the control unit, the second electrode plate transfer unit includes a second transfer arm formed in an "L" shape and forming a second central shaft, a pair of second grippers installed on both ends of the second transfer arm for sequentially picking up the negative electrode plates transferred to the second transfer position and transferring them to the stacking position, and a second rotator connected to the second central shaft for repeatedly rotating the second transfer arm within a rotation range of 180 degrees under the control of the control unit, and each of the positive electrode plates and each of the negative electrode plates are positioned such that they are sequentially stacked at the stacking position with the time difference.

It is preferable that the first transfer arm and the second transfer arm are arranged to be symmetrical to each other in standby state before rotation.

It is preferable that each of both ends of the first transfer arm defines a rotation range of 90 degrees, as the first transfer arm rotates, the first transfer arm sequentially transfers the positive electrode plates, which have been transferred to the first transfer position, to the first temporary transfer position by using any one of the pair of first grippers that is installed on one end of the first transfer arm, the positive electrode plates, which have been transferred to the first temporary transfer position, are sequentially transferred to the stacking position by using the other one of the pair of first grippers that is installed on the other end of the first transfer arm, each of both ends of the second transfer arm defines a rotation range of 90 degrees, as the second transfer arm is rotated, the second transfer arm sequentially transfers the negative electrode plates, which have been transferred to the second transfer position, to a second temporary transfer position by using any one of the pair of second grippers that is installed on one end of the second transfer arm, and the positive electrode plates, which have been transferred to the first temporary transfer position, are sequentially transferred to the stacking position by using the other one of the pair of first grippers that is installed on the other end of the first transfer arm.

The stacking part includes a stacking plate in which the stacking position is formed and the positive electrode plates and the negative electrode plates are stacked in an intersecting manner, a rail for guiding horizontal movement of the stacking plate, and a linear module for horizontally reciprocating the stacking plate within the first distance range, wherein the linear module may use a servo motor, a harmonic reducer or planetary gear with low backlash, or alternatively, may use a drum drive (DD) motor or a servo motor directly connected thereto, or may use a device that converts linear motion into rotational motion using a lever.

It is preferable that, when the positive electrode plate is loaded onto the stacking plate, the control unit uses the linear module to reciprocate the stacking plate a distance equal to a half of the first distance range along a first direction, and when the negative electrode plate is loaded onto the stacking plate, the control unit reciprocates the stacking plate a distance equal to a half of the first distance range in a second direction opposite to the first direction.

It is preferable that the separator supply unit includes a separator feeder for supplying the separator, a moving roller device which is, under the control of the control unit, disposed above the stacking plate and horizontally reciprocated in the second distance range and guides the supplied separator to be in close contact with an upper surface of the positive electrode plate that is moved along the first direction, and a separator guide for guiding the separator supplied from the separator feeder to the moving roller device.

It is preferable that the moving roller device includes a first roller device installed in the main body unit so as to be positioned above the stacking plate and configured to supply the supplied separator and a second roller device interposed between the first roller device and the stacking plate and configured to guide the separator while reciprocating within the second distance range, wherein, when the positive electrode plate is loaded onto the stacking plate, the control unit moves the second roller device a distance equal to a half of the second distance range along the second direction to supply the separator onto the upper surface of the positive electrode plate, and when the negative electrode plate is loaded onto the stacking plate, the control unit moves the second roller device a distance equal to a half of the second distance range along the first direction opposite to the second direction to supply the separator onto the upper surface of the negative electrode plate.

It is preferable that a pair of mandrel members are provided on both ends of the second roller device for temporarily fixing the separator supplied from an upper portion of both ends of the stacking plate.

It is preferable that the separator guide includes a plurality of guide rollers for guiding the separator moved along a set movement path at a plurality of positions and a tension former for forming a predetermined tension on the separator.

It is preferable that the tension former includes at least one of a pair of dancer rollers that guide the movement of the separator and are moved in directions that cross each other along a horizontal direction and a buffer roller that guides the movement of the separator and is moved up and down.

It is preferable that a foreign material removal unit for forcibly removing foreign materials formed on the positive electrode plates or the negative electrode plates to be transferred may be disposed on the first linear transfer unit and the second linear transfer unit, wherein the foreign material removal unit forcibly removes the foreign materials by supplying vacuum or compressed air.

It is preferable that the stacking unit further includes a vision unit, wherein the vision unit includes an absorber for vacuum-absorbing a pair of corners of each of the electrode plates loaded at a pair of corners in a diagonal direction of the stacking plate, and a camera for acquiring top surface images of the vacuum-absorbed electrode plates and transmitting the acquired top surface images to the control unit, and the control unit determines whether or not the top surface images matches a preset alignment image, and thereby determines the quality of alignment.

It is preferable that a tab in the shape of a rectangular plate is formed on each of the electrode plates and another camera that acquires an image of the tab and transfers the image to the control unit is disposed above the stacking plate, wherein the control unit calculates horizontal length values of the tab along a horizontal direction through the image of the tab, calculates vertical length values at both sides of the tab along a vertical direction, calculates intersection position values of the calculated horizontal length values and the vertical length values, calculates position values of corners at both ends of the tab through the intersection position values, calculate a distance between the calculated position values, compares the calculated distance with a preset normal distance, and, when the calculated distance is different from the preset normal distance, determines that the tab is defective.

In addition, it is preferable that, when the vertical lengths exceed a preset error range, the control unit determines that the tab is defective.

Meanwhile, the pair of electrode plate loading units may include a first loading unit and a second loading unit disposed at a position symmetrical to the first loading unit, the first loading unit may include a first magazine which accommodates positive electrode plates and sequentially position the positive electrode plates at a first transfer position, and the second loading unit may include a second magazine which accommodates negative electrode plates and sequentially position the negative electrode plates at a second transfer position.

Advantageous Effects

By means of the above solutions, the present invention may achieve the effects of increasing productivity of electrodes and reducing the size of equipment by supplying electrode plates of different polarities positioned in symmetrical positions to a stacking position in an intersecting manner and interposing a separator between the electrode plates.

In addition, the present invention has an effect of easily aligning the separator on an upper surface of a corresponding electrode plate by moving the electrode plate and the separator such that they are movable together along a horizontal direction.

In addition, according to the present invention, the electrode plate is transferred from the magazine onto the conveyor belt and the electrode plate transferred onto the conveyor belt is picked up and positioned at a stacking position, thereby solving a problem that, conventionally, a collision occurs when an electrode plate is transferred between moving tables.

Moreover, the present invention has an effect of preventing the supplied separator from being unaligned on a lateral side of an electrode plate by forming a predetermined tension in the separator on the lateral side of the electrode plate.

In addition, the present invention has an effect of preventing the formation of foreign substances on an electrode plate before the stacking process by cleaning the corresponding electrode plate while being supplied to the stacking position.

In addition, the present invention has an effect of preventing product defects from occurring due to misalignment through real-time monitoring of the alignment of electrode plates moved to the stacking position.

DETAILED DESCRIPTION

Figure 1:
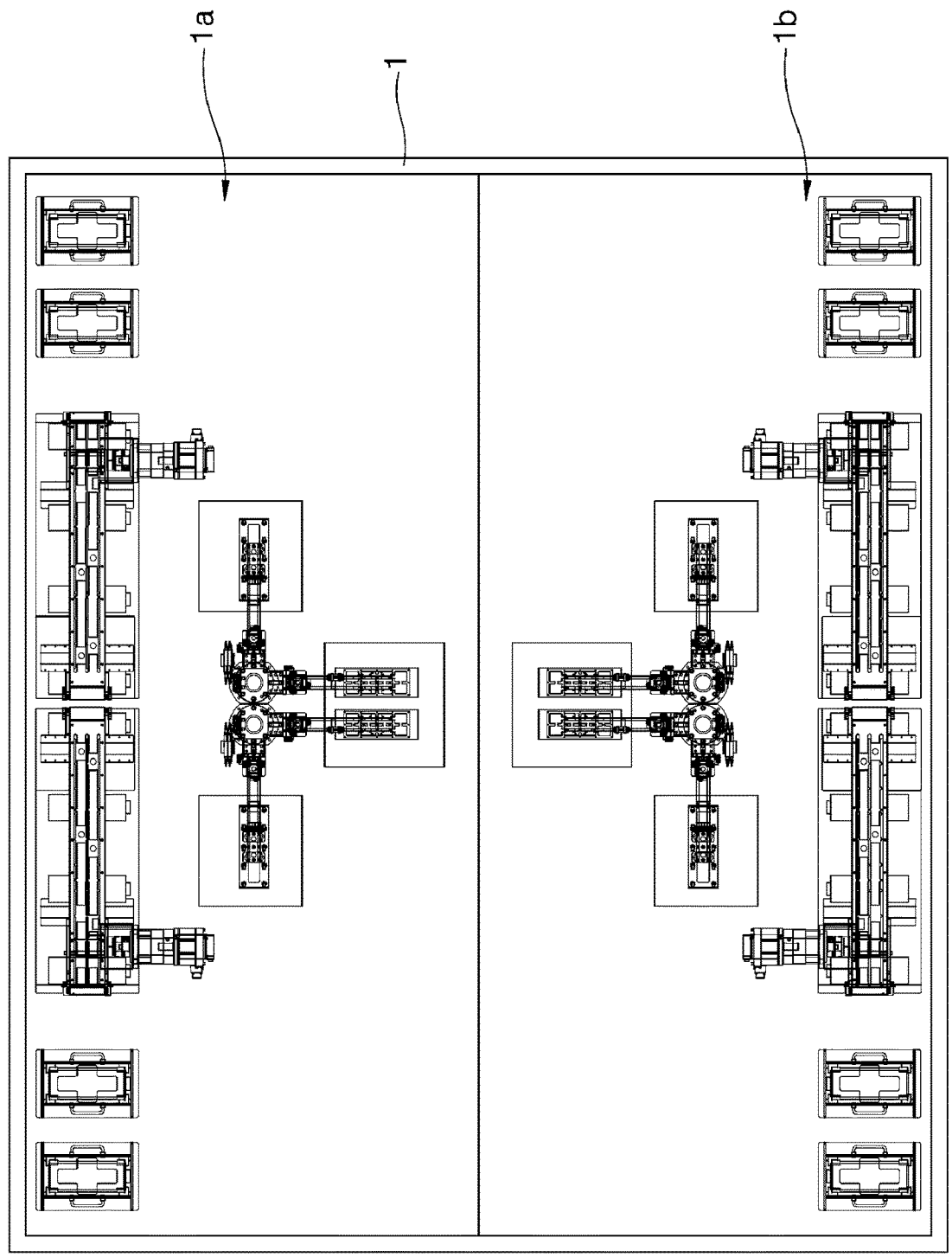
FIG. 1 is a plan view of a configuration of secondary battery manufacturing equipment of the present invention.

Hereinafter, embodiments of the present invention will be described in detail with reference to the drawings so that those of ordinary skill in the art may easily implement the present invention.

The present invention may be implemented in a variety of different forms and is not limited to the embodiments described herein.

Parts not relating to description are omitted in the drawings in order to clearly describe the present invention and like reference numerals refer to like elements throughout.

Hereinafter, when a certain element is referred to as being formed "at an upper (or lower) portion" of, or being formed "on (or under)" another element, the certain element may be directly placed on an upper surface (lower surface) of the other element.

In addition, it does not exclude that an intervening elements may also be present between the two elements.

Figure 2A:
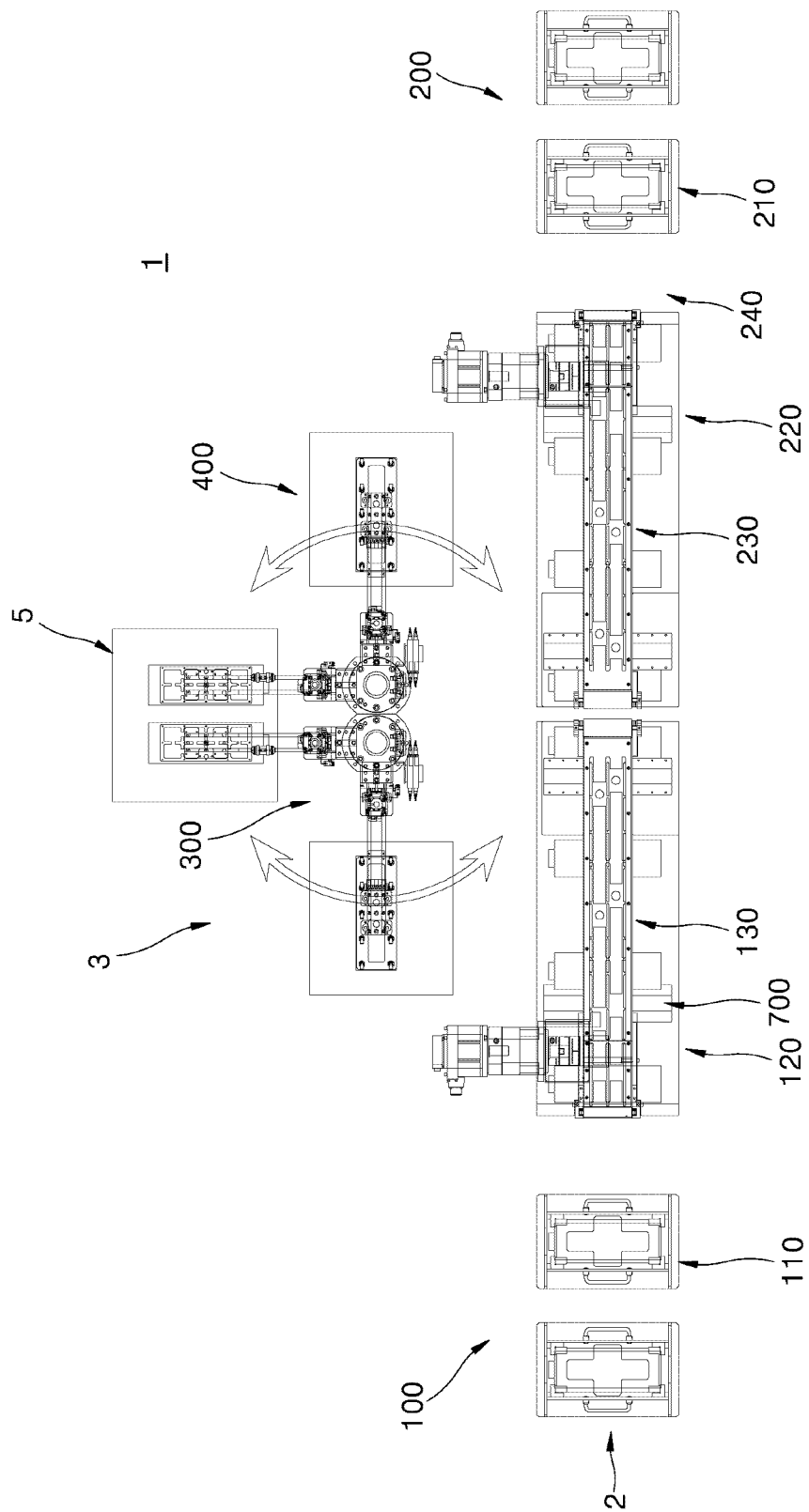
FIG. 2A is a plan view of a schematic configuration of secondary battery manufacturing equipment of the present invention.

FIG. 1 is a plan view of a configuration of a secondary battery manufacturing equipment of the present invention. FIG. 2A is a plan view of a schematic configuration of a secondary battery manufacturing equipment of the present invention.

Referring to FIGS. 1 and 2A, the secondary battery manufacturing equipment of the present invention includes largely a main body unit 1, an electrode plate loading unit 2, an electrode plate transfer unit 3, and a stacking unit 5, a separator supply unit 6 (not shown), and a control unit 4 (not shown).

Each of the above configurations will be described.

Main Body Unit 1

The main body unit 1 according to the present invention has an inner space. The inner space is divided into two spaces. The two spaces are symmetrical.

In each of the two spaces, the electrode plate loading unit 2, the electrode plate transfer unit 3, the stacking unit 5, and the separator supply unit 6 are disposed to constitute a unit apparatus 1a and 1b for performing a series of battery stacking processes. Thus, the unit apparatuses 1a and 1b perform the battery manufacturing process independently of each other. Therefore, it is possible to improve the product yield.

Hereinafter, a configuration of a unit apparatus disposed in one of the two spaces will be described as a representative example. Each unit apparatus has the same configuration.

Electrode Plate Loading Unit 2

Figure 3A:
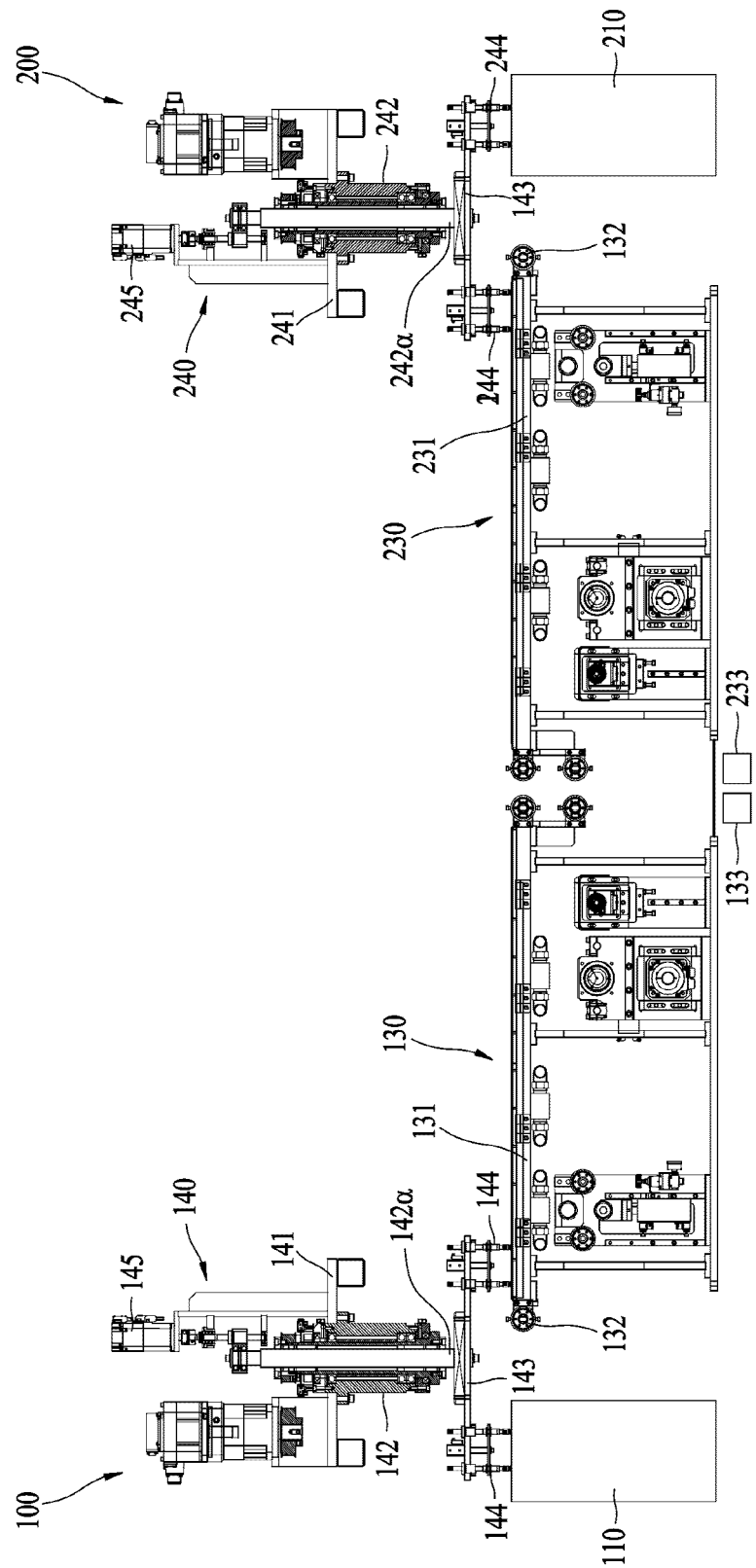
FIG. 3A is a front view of an electrode plate loading unit according to the present invention.
Figure 4:
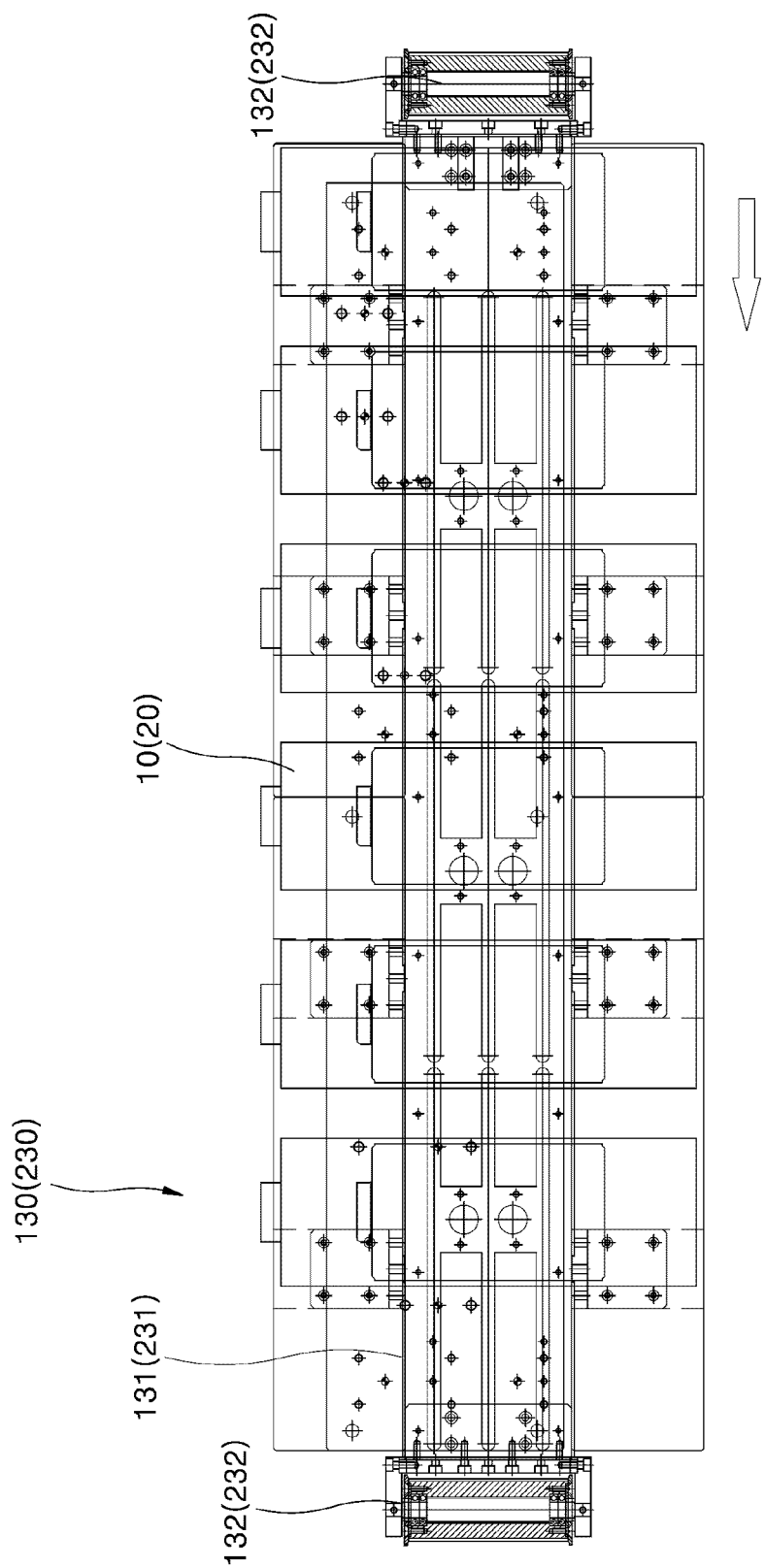
FIG. 4 is a plan view of a configuration of first and second linear transfer units according to the present invention.
Figure 5:
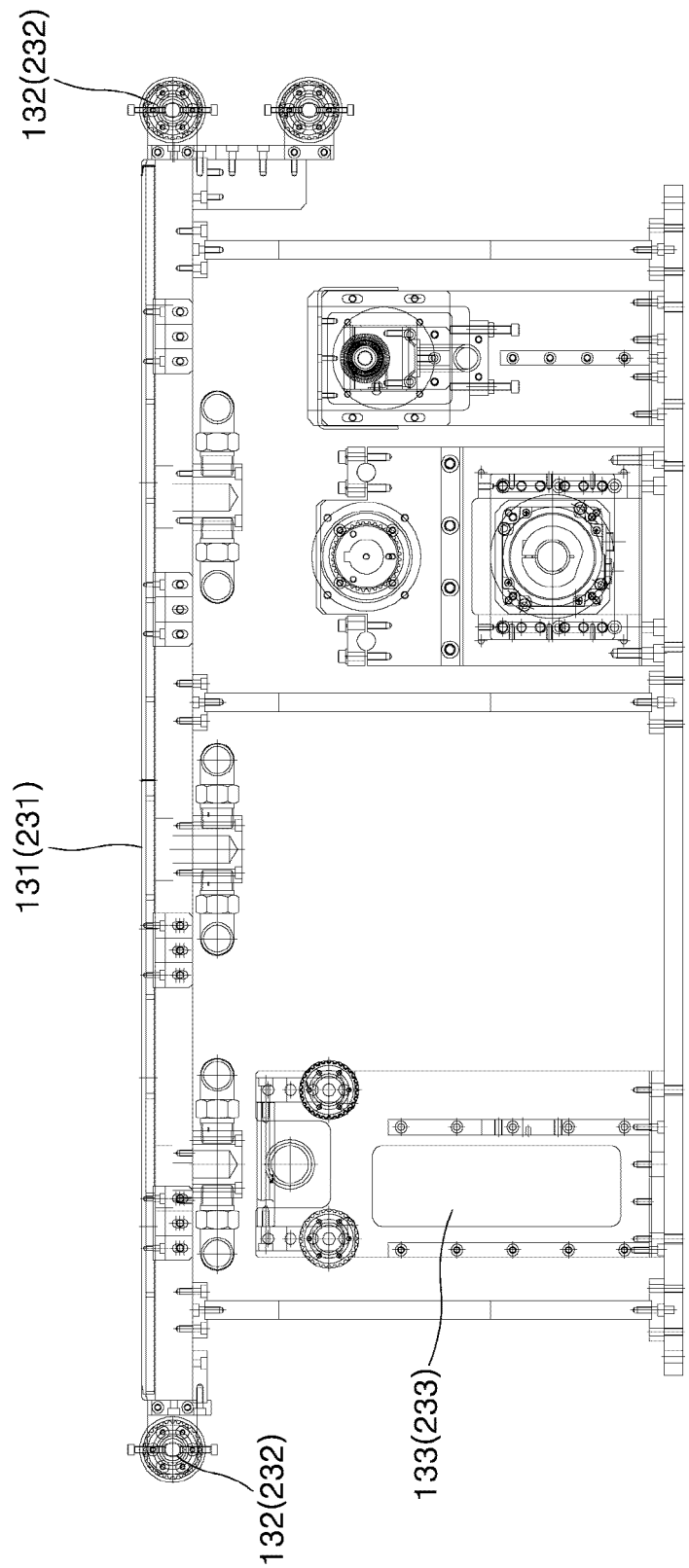
FIG. 5 is a front view of the configuration of the first and second linear transfer units according to the present invention.

FIG. 3A is a front view of an electrode plate loading unit according to the present invention. FIG. 4 is a plan view of a configuration of first and second linear transfer units according to the present invention. FIG. 5 is a front view of the configuration of the first and second linear transfer units according to the present invention.

Figure 3B:
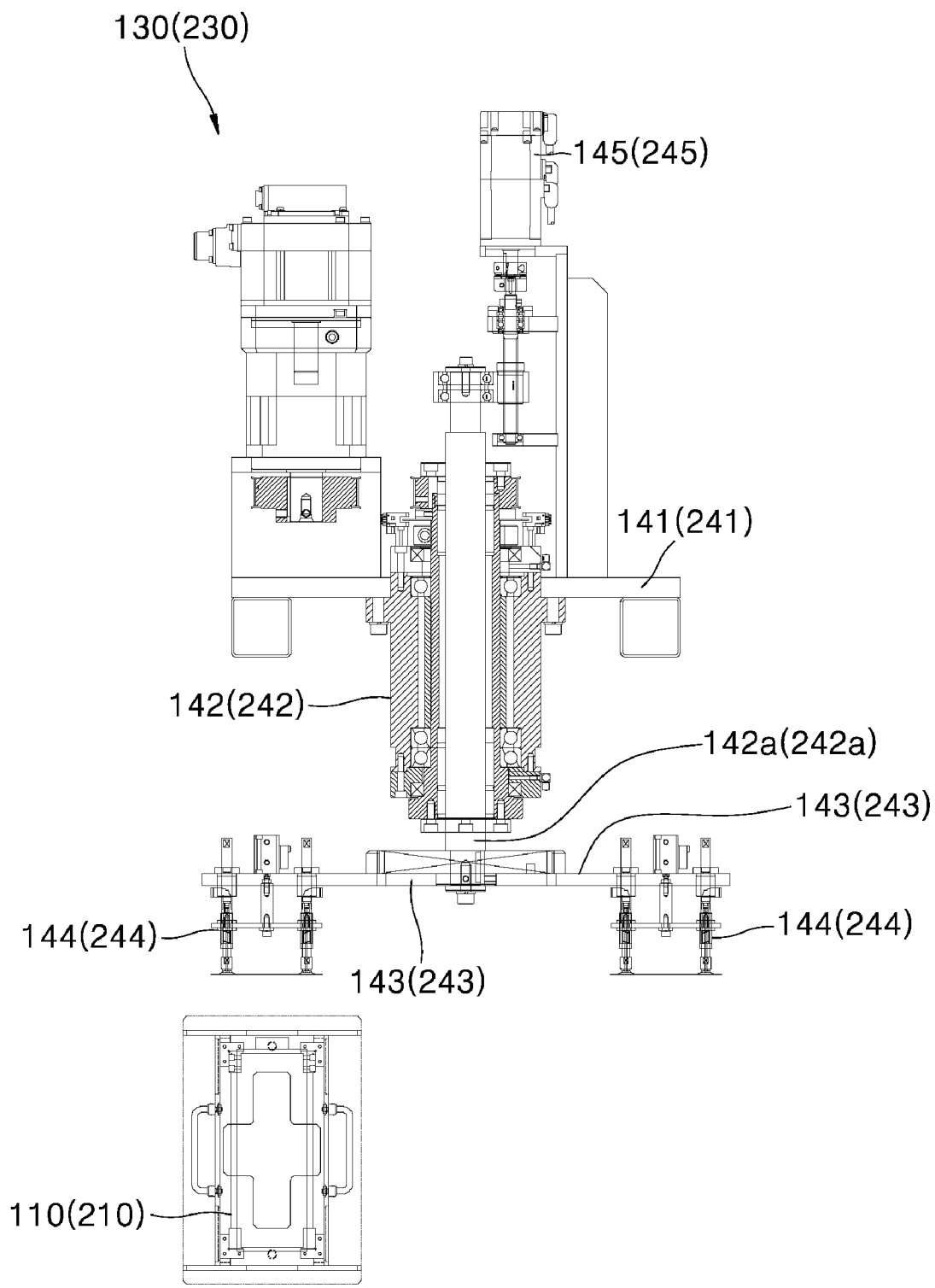
FIG. 3B is a front view of first and second rotational transfer units according to the present invention.

Referring to FIGS. 3 to 5, a pair of electrode plate loading units 2 are provided. The electrode plate loading units 2 configured as a pair supply electrode plates 10 and 20 having different polarities.

The pair of electrode plate loading units 2 include a first loading unit 100 and a second loading unit 200. The first and second loading units 100 and 200 have the same configuration. The first loading unit 100 and the second loading unit 200 are disposed to correspond to and be symmetrical to each other in the main body unit 1.

The first loading unit 100 according to the present invention includes a first magazine 110 and a first transfer unit 120.

Positive electrode plates 10 are sequentially loaded in the first magazine 110 in a vertical direction. The first magazine 110 is a device to sequentially position the positive electrode plates 10 in a first drawn position along the upper side thereof.

The first transfer unit 120 sequentially transfers the anode plates 10 from the first magazine 110 to a first transfer position.

The first transfer unit 120 includes a first linear transfer unit 130 disposed apart from the first magazine 110 and a first rotation transfer unit 140 disposed above and between the first magazine 110 and the first linear transfer unit 130.

The first rotation transfer unit 140 includes a first rotation transfer unit body 141, a first rotation module 142 installed in the first rotation transfer unit body 141 and having a first rotary shaft 142a along a vertical direction, a first rotating plate 143 installed on the first rotary shaft 142a and rotated about the first rotary shaft 142a, a plurality of first grip members 144 disposed at intervals along the periphery of the first rotating plate 143 for sequentially griping the positive electrode plates 10 as they are rotated a predetermined angle, and a first elevator 145 installed in the main body unit 1 and configured to move the first rotation transfer unit body 141 upward and downward. The first elevator 145 has a shaft that moves upward and downward along a vertical direction. The shaft is connected to the first rotation transfer unit body 141.

The first linear transfer unit 130 includes a first conveyor belt 131 that rotates continuously, a pair of first driving rollers 132 that rotatably support both ends of the first conveyor belt 131, and a first module 133 that rotates the pair of first driving rollers 132.

The plurality of first grip members 144 sequentially grip the positive electrode plates 10 from the first magazine 110 and transfer them to one end upstream of the first conveyor belt 131.

The first conveyor belt 131 horizontally moves the sequentially transferred positive electrode plates 10 to the first transfer position.

The second loading unit 200 according to the present invention includes a second magazine 210 in which negative electrode plates 20 are accommodated, and a second transfer unit 220 for sequentially transferring the negative electrode plates 20 to a second transfer position from the second magazine 210.

The negative electrode plates 20 are sequentially loaded in the second magazine 210 in a vertical direction. The second magazine 210 is a device to sequentially position the negative electrode plates 20 at a second withdrawal position along the upper side thereof.

The second transfer unit 220 sequentially transfers the negative electrode plates 20 from the second magazine 210 to a second transfer position.

The second transfer unit 220 includes a second linear transfer unit 230 disposed apart from the second magazine 210 and a second rotation transfer unit 240 disposed above and between the second magazine 210 and the second linear transfer unit 230.

The second rotation transfer unit 240 includes a second rotation transfer unit body 241, a second rotation module 242 installed on the second rotation transfer unit body 241 and having a second rotary shaft 242a along a vertical direction, a second rotating plate 243 installed on the second rotary shaft 242a and rotated about the second rotary shaft 242a, a plurality of second grip members 244 disposed at intervals along the periphery of the second rotating plate 243 and configured to sequentially grip the negative electrode plates 20 as they are rotated a predetermined angle, and a second elevator 245 installed in the main body unit 1 and configured to move the second rotation transfer unit body 242 upward and downward.

The second linear transfer unit 230 includes a second conveyor belt 231 that rotates continuously, a pair of second driving rollers 232 that rotatably support both ends of the second conveyor belt 231, and a second module 233 that rotates the pair of second driving rollers 232.

The second conveyor belt 231 horizontally moves the sequentially transferred negative electrode plates 20 to the second transfer position.

There is a predetermined time difference between the time of transfer of the positive electrode plates 10 to the first transfer position and the time of transfer of the negative electrode plates 20 to the second transfer position.

Here, each of the first rotation module 142 and the second rotation module 242 may rotate 180 degrees when configured with two heads, and may rotate 90 degrees when configured with four heads.

Here, the first and second modules 133 and 233 are driven under the control of the control unit.

The first and second grip members 144 and 244 have vacuum absorption members installed thereon. The vacuum absorption members may grip the upper surface of the positive or negative electrode plate through vacuum absorption or release it depending on whether or not vacuum is provided by a vacuum provider.

Figure 2B:
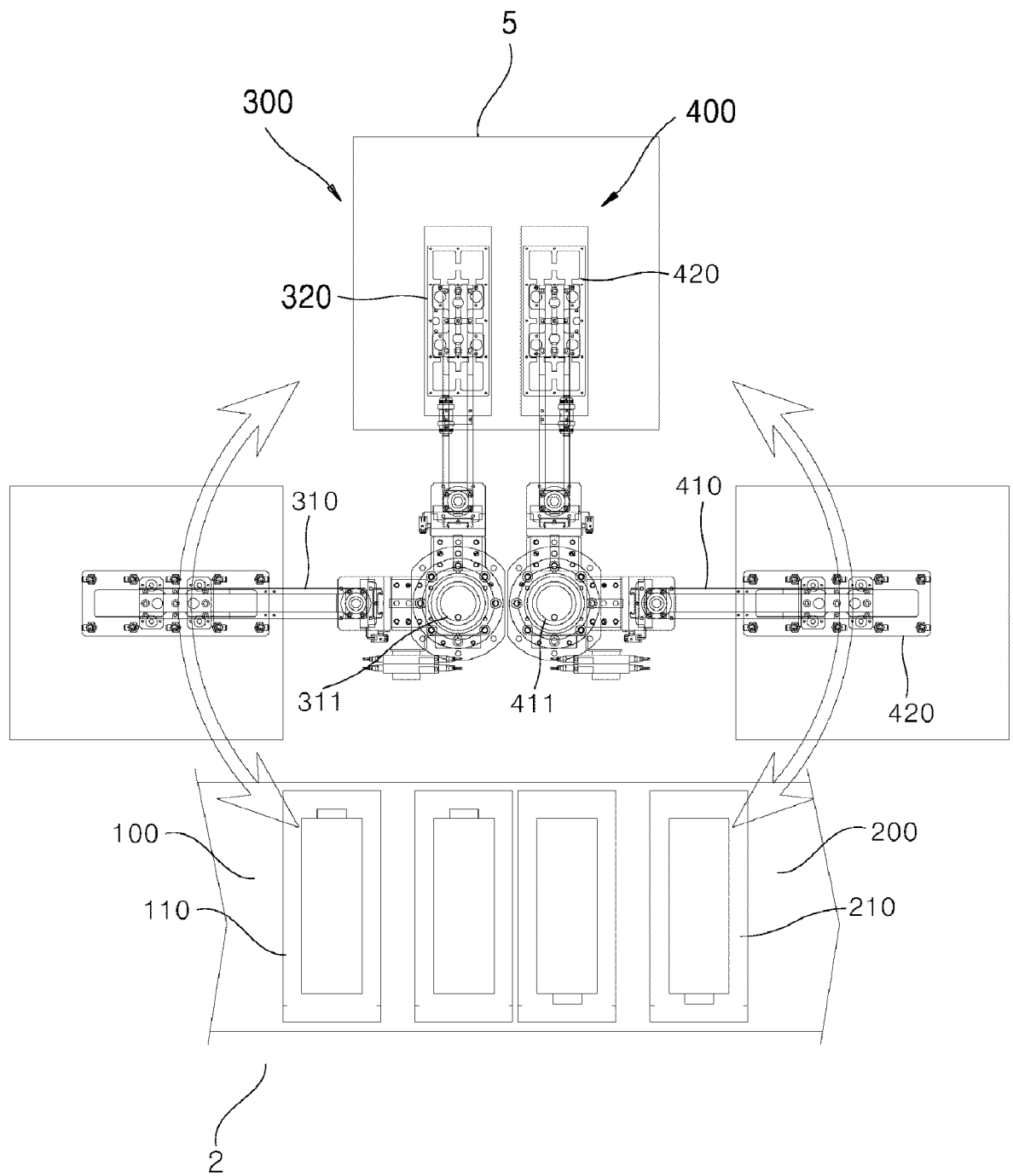
FIG. 2B is a plan view of another example of an electrode plate loading unit according to the present invention.

FIG. 2B is a plan view of another example of a electrode plate loading unit according to the present invention.

Referring to FIG. 2B, the electrode plate loading unit 2 according to the present invention may transfer the electrode plates 10 and 20 from the magazines to first and second temporary transfer positions and the stacking positions, respectively.

That is, the electrode plate loading unit 2 according to the present invention may include only the first and second magazines 110 and 210 without the first and second transfer units 120 and 220 described above.

The first and second transfer positions of the electrode plates 10 and 20 may be formed in the first and second magazines 110 and 210. Accordingly, the electrode plate transfer unit 3, which will be described below, may directly pick up and transfer the electrode plates 10 and 20 from the first and second magazines 110 and 210, respectively.

A plurality of positive electrode plates 10 are accommodated in the first magazine 110. Alternatively, a plurality of negative electrode plates 20 are accommodated in the second magazine 210. In this case, tabs formed at each end of the positive and negative electrode plates 10 and 20 are disposed at positions opposite to each other.

Each electrode plate 10 and 20 may be discharged from the first magazine 110 and the second magazine 210 through various ways as below.

First, the electrode plates 10 and 20 may be inserted into the front of the first and second magazines 110 and 210, respectively, and discharged to the left and right side.

In addition, the electrode plates 10 and 20 may be inserted into the first and second magazines 110 and 210, respectively, along the left and right side and discharged to the front side.

In addition, the electrode plates 10 and 20 may be inserted into the first and second magazines 110 and 210, respectively, along the left and right side by using a lift device and be discharged to the lower side.

Electrode Plate Transfer Unit 3

Figure 6A:
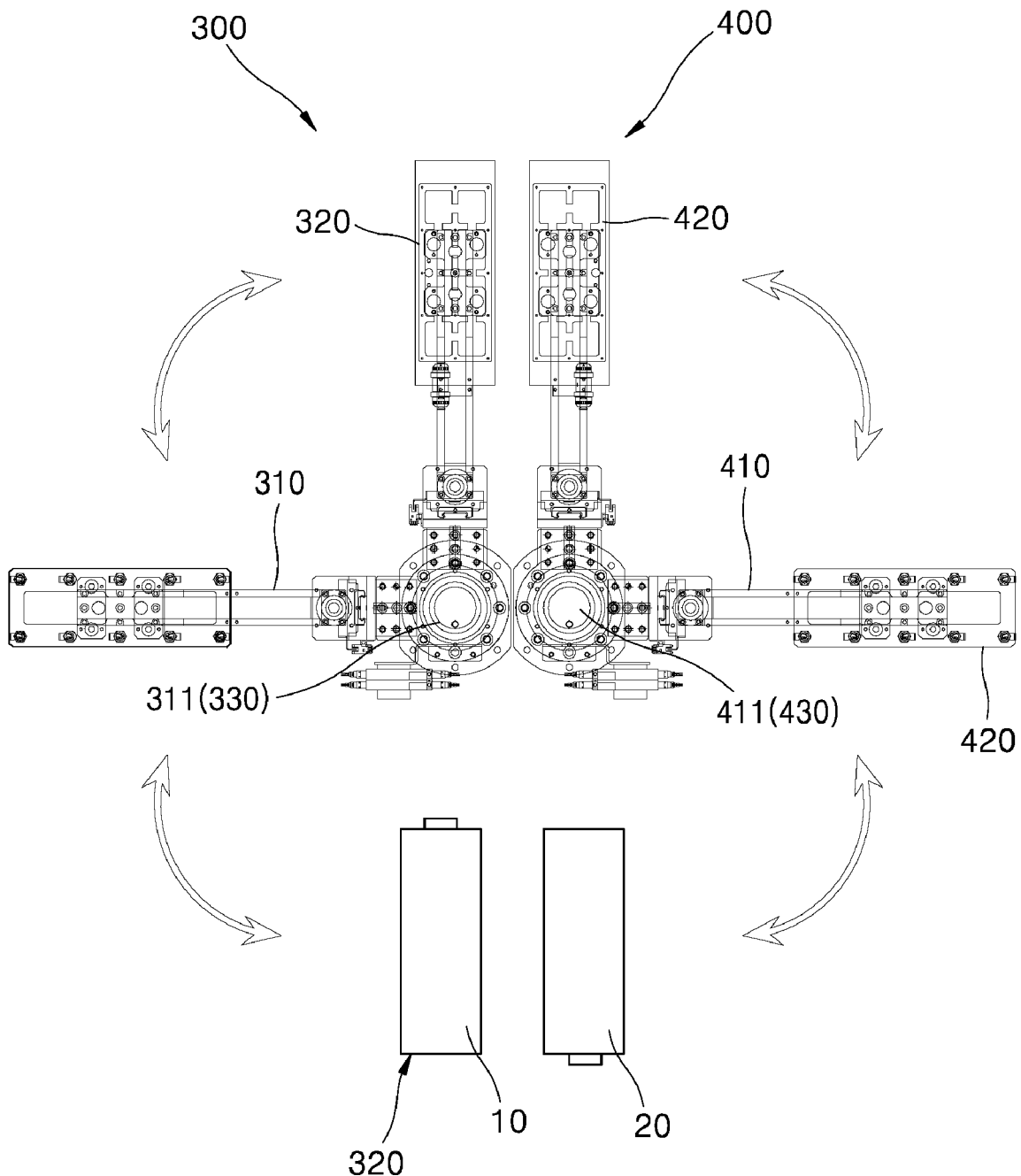
FIG. 6A is a plan view of first and second electrode plate transfer units according to the present invention.
Figure 6B:
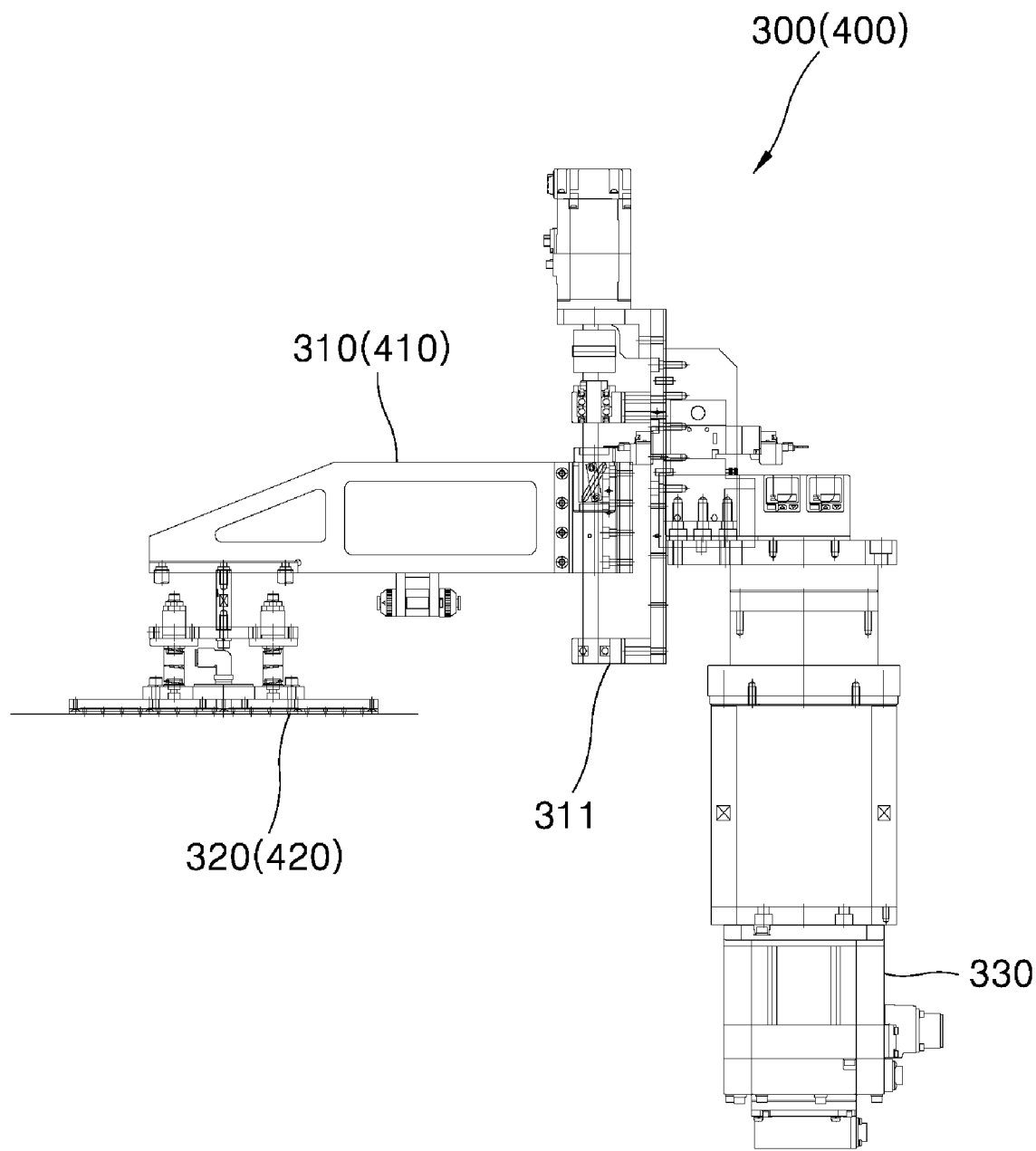
FIG. 6B is a front view of the first and second electrode plate transfer parts according to the present invention.

FIGS. 6A and 6B are views of a first electrode plate transfer unit and a second electrode plate transfer unit according to the present invention.

The electrode plate transfer unit 3 according to the present invention transfers electrode plates 10 and 20 of different polarities, supplied from the first and second electrode plate loading units 100 and 200, to a set stacking position in an intersecting manner.

Referring to FIGS. 6A and 6B, the first electrode plate transfer unit 300 according to the present invention sequentially picks up and rotates the positive electrode plates 10 transferred to the first transfer position.

In addition, the second electrode plate transfer unit 400 according to the present invention sequentially picks up and rotates the negative electrode plates 20 transferred to the second transfer position in such a manner that the predetermined time difference is maintained.

The above-described first and second electrode plate transfer units 300 and 400 have the same configuration. However, they are arranged to be symmetrical to each other.

The configuration of the first and second electrode plate transfer units 300 and 400 will be described.

The first electrode plate transfer unit 300 according to the present invention includes a first transfer arm 310 formed in a vertically inverted "L" shape and forming a first central shaft 311, a pair of first grippers 320 installed on both ends of the first transfer arm 310 for sequentially picking up the positive electrode plates 10 transferred to the first transfer position and transferring them to the stacking position, and a first rotator 330 connected to the first central shaft 311 and configured to repeatedly rotate the first transfer arm 310 within a rotation range of 180 degrees under the control of the control unit 4.

Each of both ends of the first transfer arm 310 defines a rotation range of 90 degrees.

As the first transfer arm 310 is rotated, the first transfer arm 310 sequentially transfers the positive electrode plates 10, which have been transferred to the first transfer position, to the first temporary transfer position by using any one of the pair of first grippers 320 that is installed on one end of the first transfer arm 310.

The positive electrode plates 10, which have been transferred to the first temporary transfer position, are sequentially transferred to the stacking position by using the other one of the pair of first grippers 320 that is installed on the other end of the first transfer arm 310.

Accordingly, by transferring the positive electrode plate 10 at a rotation interval of 90 degrees using both ends of the first transfer arm 310, the efficiency of transfer of the positive electrode plate 10 to the stacking position can be increased.

In addition, the second electrode plate transfer unit 400 includes a second transfer arm 410 formed in an "L" shape and forming a second central shaft 411, a pair of second grippers 420 installed on both ends of the second transfer arm 410 for sequentially picking up the negative electrode plates 20 transferred to the second transfer position and transferring them to the stacking position, and a second rotator 430 connected to the second central shaft 411 and configured to repeatedly rotate the second transfer arm 410 within a rotation range of 180 degrees under the control of the control unit 4.

The first transfer arm 310 and the second transfer arm 410 are arranged to be symmetrical to each other in standby state before rotation.

Each of both ends of the second transfer arm 410 defines a rotation range of 90 degrees.

As the second transfer arm 410 is rotated, the second transfer arm 410 sequentially transfers the negative electrode plates 20, which have been transferred to the second transfer position, to a second temporary transfer position by using any one of the pair of second grippers 420 that is installed on one end of the second transfer arm 410.

The negative electrode plates 20, which have been transferred to the second temporary transfer position, are sequentially transferred to the stacking position by using the other one of the pair of second grippers 420 that is installed on the other end of the second transfer arm 410.

Accordingly, the present invention uses both ends of the second transfer arm 420 to transfer the negative electrode plate 20 at a rotation interval of 90 degrees, thereby increasing the efficiency of transfer of the negative electrode plate 20 to the stacking position.

In this case, as the first and second transfer arms 310 and 410 according to the present invention are alternately rotated with a predetermined time difference, the positive electrode plates 10 and the negative electrode plates 20 may be supplied in an intersecting manner so that they can be stacked at intersecting positions. That is, each of the positive electrode plates and each of the negative electrode plates are positioned such that they are sequentially stacked at the stacking position with the time difference.

Stacking Unit 5

Figure 7:
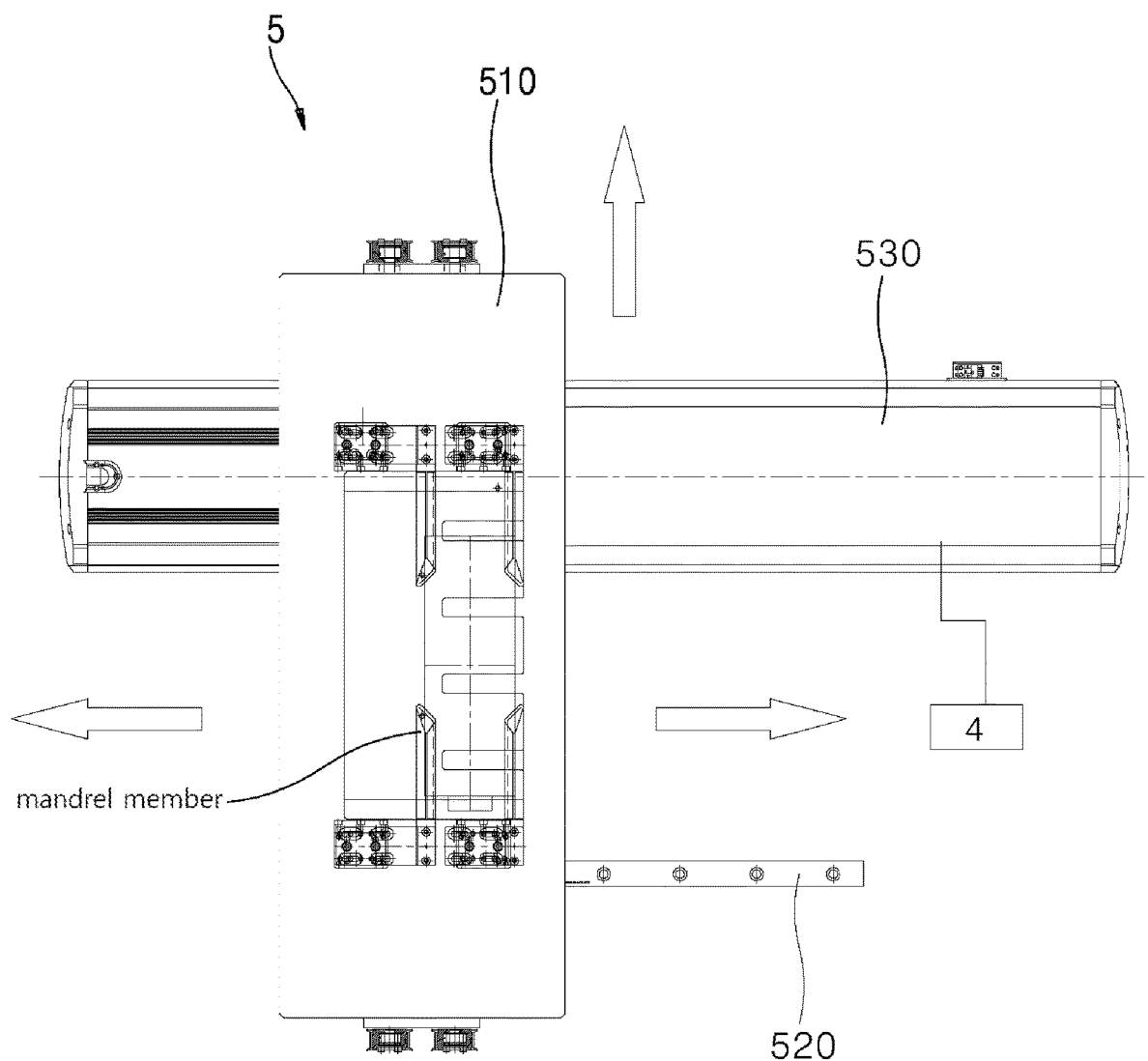
FIG. 7 is a plan view of a stacking unit according to the present invention.
Figure 8:
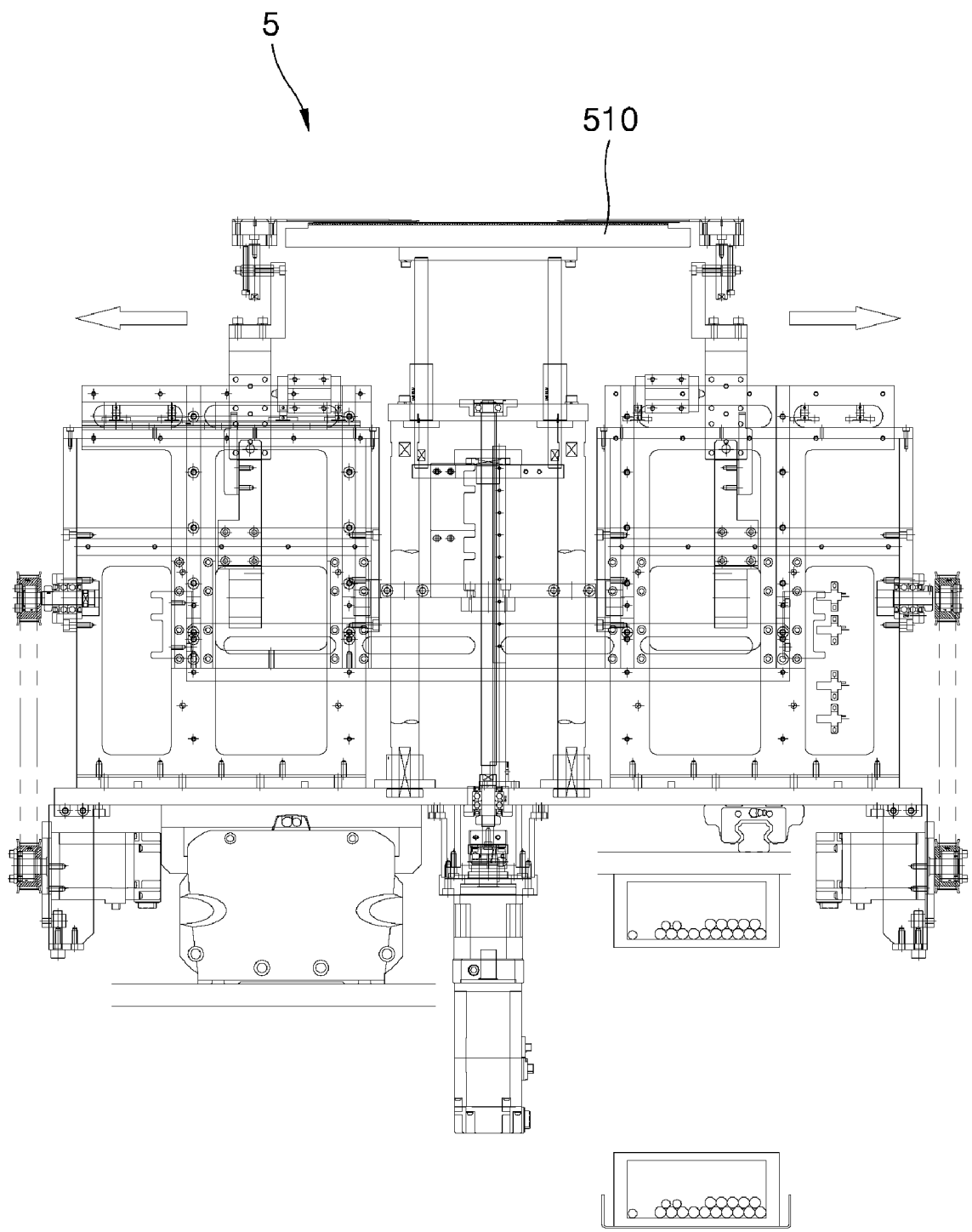
FIG. 8 is a front view of the stacking unit according to the present invention.

FIG. 7 is a plan view of the stacking unit according to the present invention. FIG. 8 is a front view of the sacking unit according to the present invention.

Referring to FIGS. 7 and 8, the stacking unit 5 according to the present invention is installed in the main body unit 1 so as to be disposed at the stacking position and horizontally reciprocates within a first distance range which is set as the electrode plates 10 and 20 are transferred in an intersecting manner.

The stacking unit 5 according to the present invention includes a stacking plate 510, a rail 520, and a linear module 530.

The stacking plate 510 provides the stacking position, in which each of the positive electrode plates 10 and each of the negative electrode plates 20 are stacked in an intersecting manner.

The rail 520 is installed on the main body 1 to guide the horizontal movement of the stacking plate 510.

The linear module 530 horizontally reciprocates the stacking plate 510 within the first distance range.

When the positive electrode plate 10 is loaded onto the stacking plate 510, the control unit 4 according to the present invention uses the linear module 530 to reciprocate the stacking plate 510 a distance equal to a half of the first distance range along a first direction.

In addition, when the negative electrode plate 20 is loaded onto the stacking plate 510, the control unit 4 reciprocates the stacking plate 510 a distance equal to a half of the first distance range in a second direction opposite to the first direction.

Separator Supply Unit 6

Figure 9:
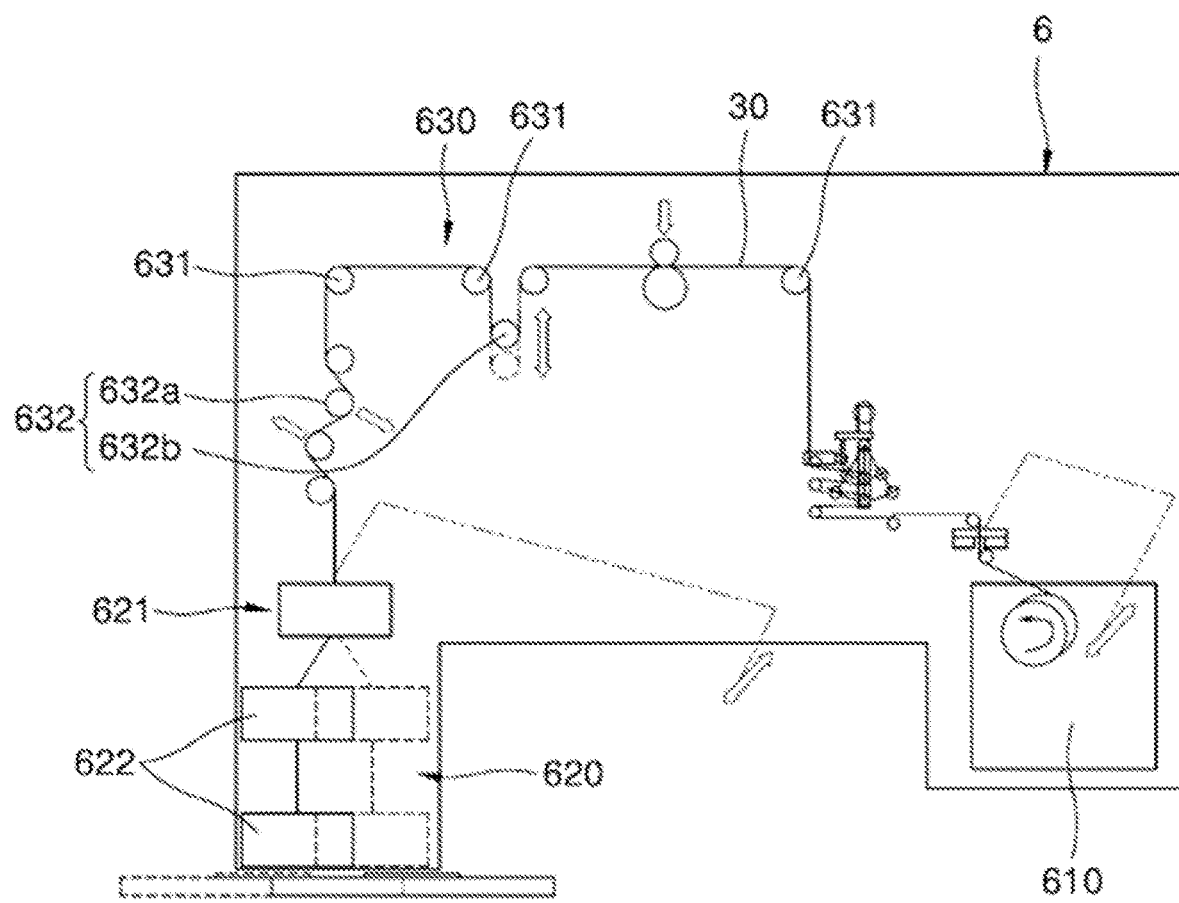
FIG. 9 is a diagram schematically illustrating a configuration of a separator supply unit according to the present invention.

FIG. 9 is a diagram schematically showing the configuration of the separator supply unit according to the present invention.

Referring to FIG. 9, the separator supply unit 6 according to the present invention includes a separator feeder 610, a moving roller device 620, and a separator guide 630.

The separator feeder 610 according to the present invention supplys a separator 30 wound in the form of a roll having a predetermined length.

Under the control of the control unit 4, the moving roller device 620 is disposed above the stacking plate 510 and horizontally reciprocated in the second distance range and guides the supplied separator 30 to be in close contact with the upper surface of the positive electrode plate 10 that is moved along the first direction.

In addition, the moving roller device 620 guides the supplied separator 30 to be in close contact with the upper surface of the negative electrode plate 20 that is moved along the second direction.

The separator guide 630 according to the present invention guides the separator 30 supplied from the separator feeder 610 to the moving roller device 620.

The separator 30 according to the present invention described above is moved along a predetermined movement path.

In addition, the moving roller device 620 described above includes a first roller device 621 and a second roller device 622.

The first roller device 621 is installed in the main body unit 1 such that it is positioned above the stacking plate 510, and guides the separator 30. The position of the first roller device 621 is fixed.

The second roller device 622 is interposed between the first roller device 621 and the stacking plate 510 and guides the separator 30 while being reciprocated in the second distance range.

Here, when the positive electrode plate 10 is loaded onto the stacking plate 510, the control unit 4 according to the present invention moves the second roller device 622 a distance equal to a half of the second distance range along the second direction to supply the separator 30 onto the upper surface of the positive electrode plate 10.

The main body unit 1 according to the present invention has a sliding rail (not shown) installed thereon. The second roller device 622 may be provided with another linear module that reciprocates with the second distance range along the first direction and the second direction. The linear module may be driven under the control of the control unit.

In addition, when the negative electrode plate 20 is loaded onto the stacking plate 510, the control unit 4 moves the second roller device 622 a distance equal to a half of the second distance range along the first direction opposite to the second direction to supply the separator 30 onto the upper surface of the negative electrode plate 20.

Further, a pair of mandrel members (not shown) are provided on both ends of the second roller device 622 for temporarily fixing the separator 30 supplied from the upper portion of both ends of the stacking plate 510. The mandrel member is a member such as a shaft plate.

The pair of mandrel members serves to temporarily hold the separator 30 supplied from the first roller device 621, thereby solving a problem that the separator 30 is lifted or unaligned at the end of the electrode plate while an operation of interposing the separator 30 on the positive electrode plate 10 or the negative electrode plate 20 is in progress.

In addition, the separator guide 630 according to the present invention includes a plurality of guide rollers 631 for guiding the separator 30 moved along the set movement path at a plurality of positions, and a tension former 632 for forming a predetermined tension on the separator 30.

The tension former 632 according to the present invention includes at least one of a pair of dancer rollers 632a that guide the movement of the separator 30 and are moved in directions that cross each other along a horizontal direction and a buffer roller 632b that guides the movement of the separator 30 and is moved up and down.

The tension former 632 according to the present invention. In addition, the tension former 632 may include only the buffer roller 632b. Also, the tension former 632 according to the present invention may include both the pair of dancer rollers 632a and the buffer roller 632b.

Meanwhile, referring to FIG. 2, a foreign material removal unit 700 for forcibly removing foreign materials formed on the positive electrode plates 10 or the negative electrode plates 20 to be transferred is disposed on the first linear transfer unit 130 and the second linear transfer unit 230 according to the present invention.

The foreign material removal unit 700 forcibly removes the foreign materials by supplying vacuum or compressed air. The foreign material removal unit 700 may be a device for forming a vacuum suction force. The vacuum suction force may be formed by a vacuum device driven under the control of the control unit. The vacuum device may be disposed on a predetermined position of the first and second conveyor belts 131 and 231, and may include suctions that remove the foreign materials by vacuum suction force. In addition, the foreign material removal unit 700 may include a blower for discharging compressed air.

Figure 10:
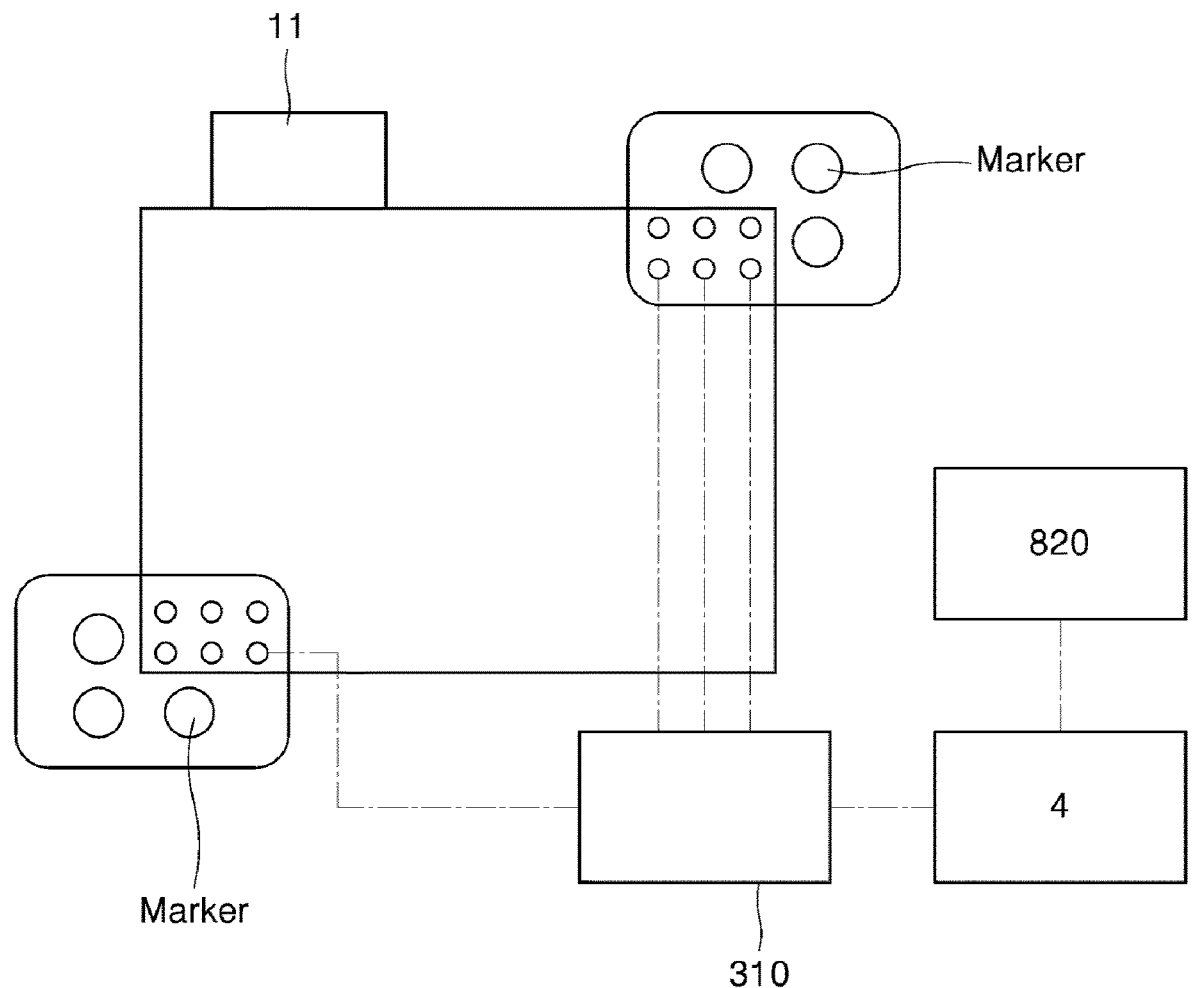
FIG. 10 is a conceptual diagram illustrating a configuration for inspecting an alignment state of an electrode plate according to the present invention.

FIG. 10 is a conceptual diagram illustrating a configuration for inspecting an alignment state of an electrode plate according to the present invention.

Referring to FIG. 10, the stacking unit 5 according to the present invention further includes a vision part 800.

The vision unit 800 according to the present invention includes an absorber 810 for vacuum-absorbing a pair of corner bottoms in a diagonal direction of each of the absorbed electrode plates 10 and 20 loaded onto the stacking plate 510, and a camera 820 for acquiring top surface images of the vacuum-absorbed electrode plates 10 and 20 and transmitting the acquired top surface images to the control unit 4.

The control unit 4 determines whether or not the top surface images matches a preset alignment image, and thereby determines the quality of alignment.

Figure 11:
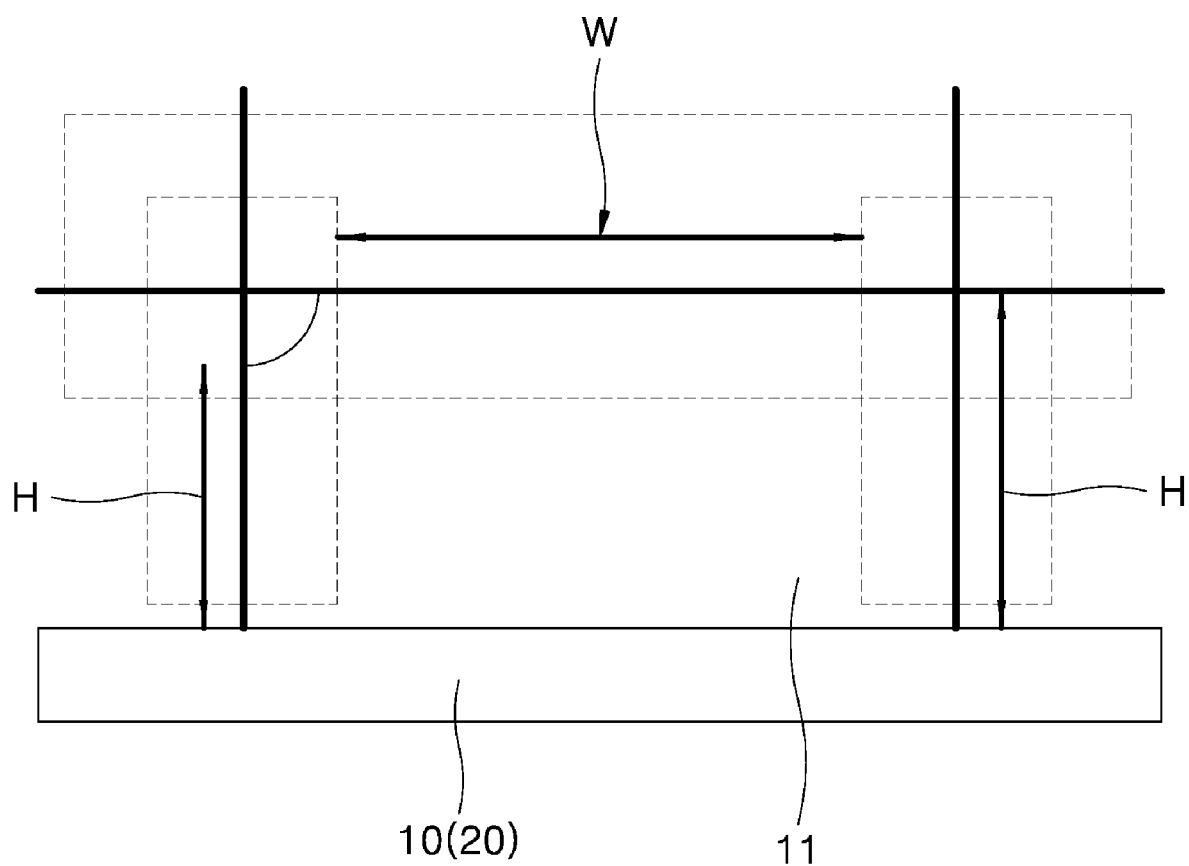
FIG. 11 is a diagram illustrating an example of a configuration for inspecting a bending state of tabs formed on electrode plates according to the present invention.

FIG. 11 is a diagram illustrating an example of a configuration for inspecting a bending state of tabs formed on electrode plates according to the present invention.

Referring to FIG. 11, a tab 11 in the shape of a rectangular plate is formed on the electrode plates 10 and 20 according to the present invention, and another camera 130 that acquires an image of the tab 11 and transfers the image to the control unit 4 is disposed above the stacking plate 510.

The control unit 4 calculates a horizontal length W of the tab 11 along the horizontal direction through the image of the tab 11.

The control unit 4 calculates vertical lengths H at both sides of the tab 11 along the vertical direction.

The control unit 4 calculates intersection position values of the calculated horizontal length W and vertical lengths H.

The control unit 4 calculates position values of the corners at both ends of the tab 11 through the intersection position values.

The control unit 4 calculates a distance between the calculated position values.

The control unit 4 compares the calculated distance with a preset normal distance, and when the calculated distance is different from the preset normal distance, determines that the tab is defective.

Accordingly, in the case where a portion of one or both of the corners at both ends of the tab 11 sags downward, by taking into account both the horizontal length W and the vertical length H of the tab 11, the accuracy may be improved compared to a method of measuring only a width of the tab.

In addition, the control unit 4 may compare the image of the tab 11 acquired as described above with a preset image to determine the quality of the tab.

Also, the control unit 4 may compare the measured top surface image and a preset reference image to determine whether the tab is bent, or compare the area of the measured top surface image with a preset reference area to determine whether the tab is satisfactory or defective.

Hereinafter, a secondary battery manufacturing method using secondary battery manufacturing equipment according to the present invention will be described.

The method according to the present invention will be described with reference to the above-described drawings.

A secondary battery manufacturing method using secondary battery manufacturing equipment according to the present invention includes the steps of loading an electrode plate, transferring the electrode plate, and forming a separator.

Electrode Plate Loading Step

A process of transferring the positive electrode plate 10 will be described.

The first loading unit 100 transfers the positive electrode plates 10 to a first transfer position.

Here, the first rotation transfer unit 140 rotates the first grip members 144 within a predetermined angle range. Each of the first grip members 144 is lowered out of the corresponding position by the first elevator 145. The first grip member 144 vacuum-absorbs the corresponding positive electrode plate 10 loaded in the first magazine 110.

The first grip member 144 is rotated to be positioned above the first conveyor belt 131. The first grip member 144 releases the vacuum to load the gripped positive electrode plate 10 onto the first conveyor belt 131.

The loaded positive electrode plate 10 is transferred to the first transfer position according to the movement of the first conveyor belt 131.

Accordingly, the positive electrode plate 10 is queued at the first transfer position.

The negative electrode plate 20 according to the present invention may also be transferred to the second transfer position of the second conveyor belt 231 and queued up.

The negative electrode plate 20 is also rotated on the second conveyor belt 231 by the second rotation transfer unit 240 and is sequentially supplied. In addition, the loaded negative electrode 20 is transferred to the second transfer position according to the movement of the second conveyor belt 231.

In this case, the negative electrode plate 20 is transferred and queued up with a time difference from the time when the positive electrode plate 10 is queued at the first transfer position. The time difference is made under the control of the control unit 4.

Accordingly, each of the positive electrode plate 10 and the negative electrode plate 20 is transferred and queued up in a corresponding transfer position.

Electrode Plate Transfer and Separation Film Formation Step

Figure 12:
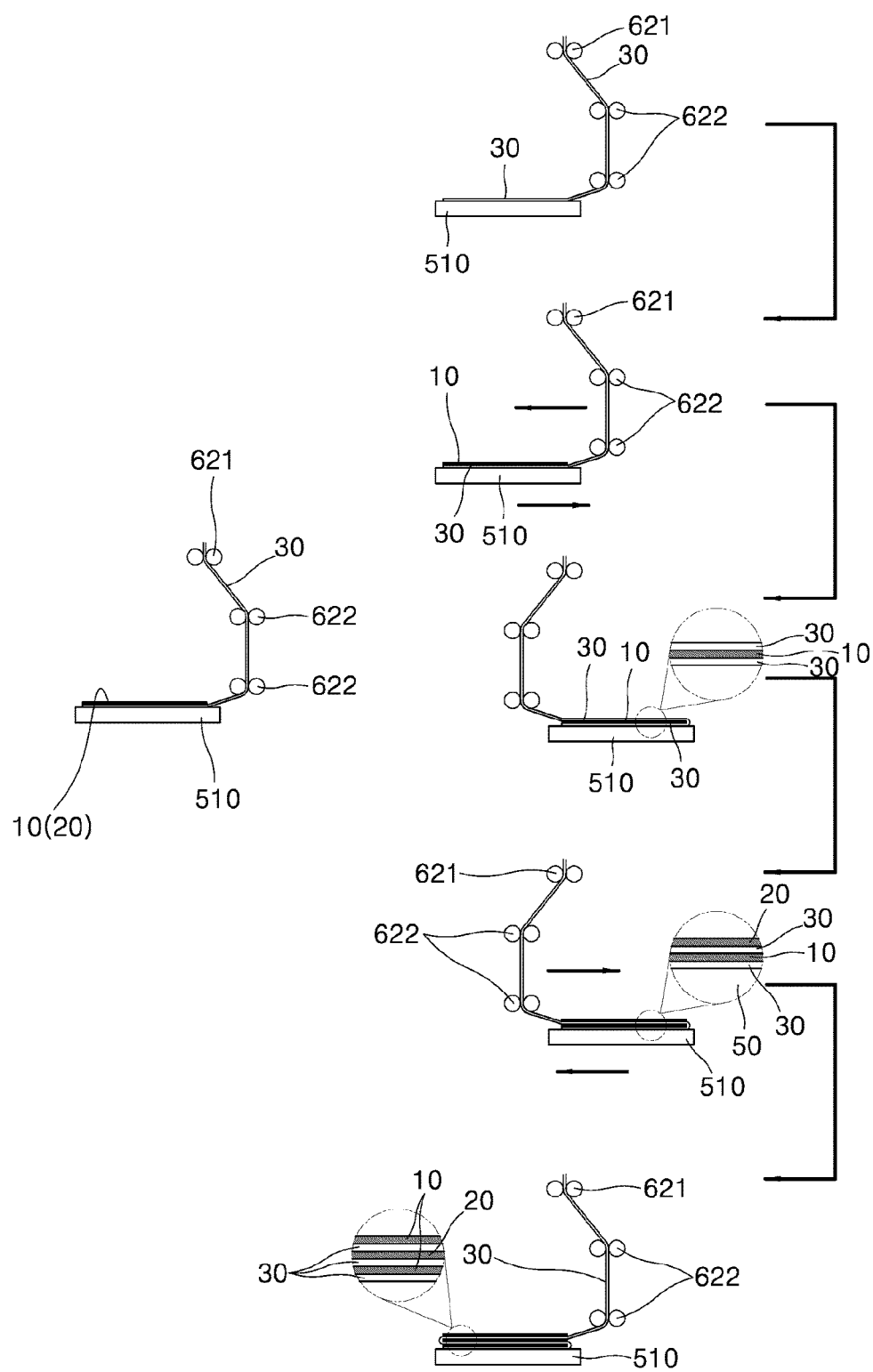
FIG. 12 is a diagram illustrating a process of forming a separator between electrode plates according to the present invention.

FIG. 12 is a diagram illustrating a process of forming a separator between electrode plates according to the present invention.

Waiting State

Referring to FIG. 12, the movement of the separator 30 is guided through the moving roller device 620. The movement of the separator 30 being supplied is guided by the first roller device 621. The separator 30 guided by the first roller device 621 is guided by the second roller device 622 and is positioned on the stacking plate 510.

Positive Electrode Plate Input Process

Referring to FIGS. 6 and 13, the positive electrode plate 10 transferred to the first transfer position is transferred to the stacking position.

The first transfer arm 310 is rotated at an interval of 180 degrees. Here, each of both ends of the first transfer arm 310 is rotated in a rotation range of 90 degrees.

That is, when the first transfer arm 310 is rotated 90 degrees in a positive (+) direction, the first gripper 320 installed on one end of the first transfer arm 310 is rotated to the first transfer position. The first gripper 320 picks up the positive electrode plate 10 queued in the first transfer position.

When the first transfer arm 310 is rotated −90 degrees, the first gripper 320 installed on one end of the first transfer arm 310 is rotated to its original position. The first gripper 320 keeps the positive electrode plate 10 queued in the first temporary transfer position formed at the original position.

Subsequently, when the first transfer arm 310 is rotated 90 degrees in the positive (+) direction, the first gripper 320 installed on the other end of the first transfer arm 310 is rotated to the first temporary transfer position. The first gripper 320 installed on the other end of the first transfer arm 310 picks up the positive electrode plate 10 queued in the first temporary transfer position. At the same time, the first gripper 320 installed on one end of the first transfer arm 310 picks up another positive electrode plate 10 queued in the first transfer position.

In addition, when the first transfer arm 310 is rotated 90 degrees in the positive (+) direction again, the first gripper 320 installed on the other end of the first transfer arm 310 is rotated to the stacking position with the positive electrode plate 10 gripped. The first gripper 320 installed on the other end of the first transfer arm 310 loads the positive electrode plate 10 at the stacking position.

Accordingly, the positive electrode plate 10 is loaded onto the stacking plate 510. In this case, the positive electrode plate 10 is loaded onto the separator 30 positioned on the stacking plate 510.

At this time, the mandrel member on one side supports the positive electrode plate 10 and the separator 30 from one side of the positive electrode plate 10. In addition, the second roller device 622 remains in standby state on one side of the stacking plate 510.

Subsequently, when the positive electrode plate 10 is loaded, the stacking plate 510 is moved by a distance equal to a half of the first distance range along the first direction within the first distance range under the control of the control unit 4.

At the same time, the second roller device 622 is moved by a distance equal to a half of the second distance range along the second direction that is opposite to the first direction.

That is, the stacking plate 510 and the second roller device 622 simultaneously move relative to each other in opposite directions.

Accordingly, the separator 30 is positioned on the upper surface of the positive electrode plate 10. In addition, the second roller device 622 is positioned above the other side of the stacking plate.

Meanwhile, the negative electrode plate 20 transferred to the second transfer position is transferred to the stacking position.

The second transfer arm 410 is rotated at an interval of 180 degrees. Here, each of both ends of the second transfer arm 410 is rotated in a rotation range of 90 degrees.

That is, when the second transfer arm 410 is rotated 90 degrees in a positive (+) direction, the second gripper 420 installed on one end of the second transfer arm 410 is rotated to the second transfer position. The second gripper 420 picks up the negative electrode plate 20 queued in the second transfer position.

When the second transfer arm 410 is rotated −90 degrees, the second gripper 420 installed on one end of the second transfer arm 410 is rotated to its original position. The second gripper 420 keeps the negative electrode plate 20 queued in the second temporary transfer position formed at the original position.

Subsequently, when the second transfer arm 410 is rotated 90 degrees in the positive (+) direction, the second gripper 420 installed on the other end of the second transfer arm 410 is rotated to the second temporary transfer position. The second gripper 420 installed on the other end of the second transfer arm 410 picks up the negative electrode plate 20 queued in the second temporary transfer position. At the same time, the second gripper 420 installed on one end of the second transfer arm 410 picks up another negative electrode plate 20 queued in the second transfer position.

In addition, when the second transfer arm 410 is rotated 90 degrees in the positive (+) direction again, the second gripper 420 installed on the other end of the second transfer arm 410 is rotated to the stacking position with the negative electrode plate 20 gripped. The second gripper 420 installed on the other end of the second transfer arm 310 loads the negative electrode plate 20 at the stacking position.

Accordingly, the negative electrode plate 20 is loaded onto the stacking plate 510. As described above, the negative electrode plate 20 is loaded such that it is stacked on the positive electrode plate 10 having the separator 30 supplied beforehand to the upper surface thereof. Accordingly, the supplied negative electrode plate 20 is positioned on the upper surface of the separator 30 positioned on the upper surface of the positive electrode plate 10.

At this time, the mandrel member on the other side supports the negative electrode plate 20 and the separator 30 from one side of the negative electrode plate 10. In addition, the second roller device 622 remains in standby state on the other side of the stacking plate 510.

Subsequently, the stacking plate 510 is moved by a distance equal to a half of the first distance range along the second direction within the first distance range under the control of the control unit 4.

At the same time, the second roller device 622 is moved by a distance equal to a half of the second distance range along the first direction that is opposite to the second direction.

That is, the stacking plate 510 and the second roller device 622 simultaneously move relative to each other in opposite directions.

Consequently, the separator 30 is disposed to be in close contact with the upper surface of the negative electrode plate 20. The stacking plate 510 is returned to its original position.

Accordingly, a structure in which the separator 30, the positive electrode plate 10, the separator 30, the negative electrode plate 20, and the separator 30 are stacked in this order may be formed on the stacking plate 510 according to the present invention. This corresponds to a unit process of forming the separator 30 between one positive electrode plate 10 and one negative electrode plate 20. This unit process is repeatedly performed. As the unit process is repeatedly performed, the secondary battery may have a structure in which a plurality of positive and negative electrode plates 10 and 20 are stacked and the separator 30 is formed therebetween.

Meanwhile, in the process of forming the separator as described above, the movement of the separator 30 may be guided using the tension former 632 with a structure in which at least one of the pair of dancer rollers 632a that are moved in directions that cross each other along the horizontal direction and the buffer roller 362b that guides the movement of the separator 30 and is moved up and down is included. Thus, a problem such as the separator being lifted at one end or the other end of the electrode plates while the separator is interposed in a zigzag shape between the electrode plates constituting the stacked structure can be solved.

Meanwhile, referring to FIG. 2, in the present invention, foreign materials generated in each of the electrode plates stacked as described above can be removed.

That is, it is possible to forcibly remove foreign materials formed on the the positive electrode plates 10 or the negative electrode plates 20 being transferred on the first linear transfer unit 130 and the second linear transfer unit 230 by using the foreign material removing unit 700.

On the other hand, referring to FIGS. 10 and 11, a pair of corner bottoms along the diagonal direction of the electrode plates 10 and 20 loaded onto the stacking plate 510 are vacuum-absorbed using an absorber.

Top surface images of the absorbed electrode plates 10 and 20 are acquired using a camera and the acquired top surface images are transmitted to the control unit 4. Then, the control unit 4 may determine whether or not the top surface images matches a preset alignment image, and thereby determine the quality of alignment.

FIG. 12 is a diagram illustrating an example of a configuration for inspecting a bending state of tabs formed on electrode plates according to the present invention.

Referring to FIG. 12, a tab 11 in the shape of a rectangular plate is formed on the electrode plates 10 and 20 in accordance with the present invention.

An image of the tab 11 is acquired from an upper portion of the stacking plate 510 using another camera 830 and transmitted to the control unit 4.

The control unit 4 calculates a horizontal length of the tab 11 along the horizontal direction through the image of the tab 11.

The control unit 4 calculates vertical lengths at both sides of the tab 11 along the vertical direction.

The control unit 4 calculates intersection position values of the calculated horizontal and vertical lengths.

The control unit 4 calculates the position values of the corners of both ends of the tab 11 through the cross position values.

The control unit 4 calculates a distance between the calculated position values.

The control unit 4 compares the calculated distance with a preset normal distance, and when the calculated distance is different from the preset normal distance, determines that the tab is defective.

Accordingly, in the case where a portion of one or both of the corners at both ends of the tab 11 sags downward, by taking into account both the horizontal length and the vertical length of the tab 11, the accuracy may be improved compared to a method of measuring only a width of the tab.

In addition, the control unit 4 may compare the image of the tab 11 acquired as described above with a preset image to determine the quality of the tab.

Through the above configurations and operations, the present invention may achieve the effects of increasing productivity of electrodes and reducing the size of equipment by supplying electrode plates of different polarities positioned in symmetrical positions to the stacking position in an intersecting manner and interposing a separator between the electrode plates.

In addition, the present invention has an effect of easily aligning the separator on an upper surface of a corresponding electrode plate by moving the electrode plate and the separator such that they are movable together along a horizontal direction.

In addition, according to the present invention, it is possible to efficiently shorten the time required to transfer the electrode plate to the stacking position by rotating the first and second transfer arms of an L shape and gripping the electrode plates using both ends thereof.

In addition, according to the present invention, the electrode plate is transferred from the magazine onto the conveyor belt and the electrode plate transferred onto the conveyor belt is picked up and positioned at a stacking position, thereby solving a problem that, conventionally, a collision occurs when an electrode plate is transferred between moving tables.

Moreover, the present invention has an effect of preventing the supplied separator from being unaligned with one lateral side of an electrode plate by forming a predetermined tension in the separator on the lateral side of the electrode plate.

In addition, the present invention has an effect of preventing the formation of foreign materials on an electrode plate before the stacking process by cleaning the corresponding electrode plate while being supplied to the stacking position.

In addition, the present invention has an effect of preventing product defects from occurring due to misalignment through real-time monitoring of the alignment of electrode plates moved to the stacking position.

In the above, specific examples of the secondary battery manufacturing equipment of the present invention and the secondary battery manufacturing method using the same have been described, but it is obvious that various implementation modifications are possible within the limit not departing from the scope of the present invention.

Therefore, the scope of the present invention should not be limited to the aforementioned embodiments, but should be defined by the equivalents to the appended claims as well as the claims.

Accordingly, it should be understood that the above-described embodiments are merely exemplary and is not limited, and it should be interpreted that the scope of the present invention is represented by the claims rather than the description, and the changes or modifications derived from the claims and the equivalents thereof pertain to the scope of the present invention.

What is claimed is:

1. A secondary battery manufacturing equipment comprising:
   a main body unit;
   a pair of electrode plate loading units, disposed in the main body unit to face each other, for supplying electrode plates of different polarities;
   an electrode plate transfer unit for transferring the electrode plates of different polarities, supplied from the pair of electrode plate loading units, to a set stacking position in an intersecting manner;
   a stacking unit installed in the main body unit to be disposed at the stacking position for horizontally reciprocating within a first distance range which is set as the electrode plates are transferred in an intersecting manner;
   a separator supply unit installed in the main body unit so as to be disposed above the stacking unit for horizontally reciprocating within a second distance range which is set such that a separator is interposed between the electrode plates that are transferred in an intersecting manner; and
   a control unit for controlling driving of the pair of electrode plate loading units, the electrode plate transfer unit, the stacking unit, and the separator supply unit;
   wherein the stacking unit includes a stacking plate in which the stacking position is formed and the electrode plates of different polarities are stacked in an intersecting manner, a rail for guiding horizontal movement of the stacking plate, and a linear module for horizontally reciprocating the stacking plate within the first distance range, and wherein, when a positive electrode plate of the electrode plates of different polarities is loaded onto the stacking plate, the control unit uses the linear module to reciprocate the stacking plate a defined distance of the first distance range along a first direction, and when a negative electrode plate of the electrode plates of different polarities is loaded onto the stacking plate, the control unit reciprocates the stacking plate a defined distance of the first distance range in a second direction opposite to the first direction.

2. The secondary battery manufacturing equipment of claim 1, wherein the pair of electrode plate loading units includes a first loading unit and a second loading unit disposed at a position symmetrical to the first loading unit,
the first loading unit includes a first magazine in which positive electrode plates of the electrode plates are accommodated and a first transfer unit for sequentially transferring the positive electrode plates from the first magazine to a first transfer position, and
the second loading unit includes a second magazine in which negative electrode plates of the electrode plates are accommodated and a second transfer unit for sequentially transferring the negative electrode plates from the second magazine to a second transfer position.

3. The secondary battery manufacturing equipment of claim 1, wherein the pair of electrode plate loading units includes a first loading unit and a second loading unit disposed at a position symmetrical to the first loading unit, the first loading unit includes a first magazine which accommodates positive electrode plates and sequentially positions the positive electrode plates at a first transfer position, and the second loading unit includes a second magazine which accommodates negative electrode plates and sequentially positions the negative electrode plates at a second transfer position.

4. The secondary battery manufacturing equipment of claim 2, wherein
the first transfer unit includes a first linear transfer unit disposed apart from the first magazine and a first rotation transfer unit disposed above and between the first magazine and the first linear transfer unit,
the first rotation transfer unit includes a first rotation transfer unit body, a first rotation module installed in the first rotation transfer unit body and having a first rotary shaft along a vertical direction, a first rotating plate installed on the first rotary shaft and rotated about the first rotary shaft, a plurality of first grip members disposed at intervals along a periphery of the first rotating plate for sequentially griping the positive electrode plates as they are rotated a predetermined angle, and a first elevator installed in the main body unit and configured to move the first rotation transfer unit body upward and downward,
the first linear transfer unit includes a first conveyor belt that rotates continuously, a pair of first driving rollers that rotatably support both ends of the first conveyor belt, and a first module that rotates the pair of first driving rollers,
the plurality of first grip members sequentially grip the positive electrode plates from the first magazine and transfer them to one end upstream of the first conveyor belt,
the first conveyor belt horizontally moves the sequentially transferred positive electrode plates to the first transfer position,
the second transfer unit includes a second linear transfer unit disposed apart from the second magazine and a second rotation transfer unit disposed above and between the second magazine and the second linear transfer unit,
the second rotation transfer unit includes a second rotation transfer unit body, a second rotation module installed on the second rotation transfer unit body and having a second rotary shaft along a vertical direction, a second rotating plate installed on the second rotary shaft and rotated about the second rotary shaft, a plurality of second grip members disposed at intervals along a periphery of the second rotating plate and configured to sequentially grip the negative electrode plates as they are rotated a predetermined angle, and a second elevator installed in the main body unit and configured to move the second rotation transfer unit body upward and downward,
the second linear transfer unit includes a second conveyor belt that rotates continuously, a pair of second driving rollers that rotatably support both ends of the second conveyor belt, and a second module that rotates the pair of second driving rollers,
the plurality of second grip members sequentially grip the negative electrode plates from the second magazine and transfer them to one end upstream of the second conveyor belt,
the second conveyor belt horizontally moves the sequentially transferred negative electrode plates to the second transfer position,
there is a predetermined time difference between the time of transfer of the positive electrode plates to the first transfer position and the time of transfer of the negative electrode plates to the second transfer position, and
each of the first rotation module and the second rotation module rotates 180 degrees when configured with two heads, and rotates 90 degrees when configured with four heads.

5. The secondary battery manufacturing equipment of claim 4, wherein the electrode plate transfer unit includes a first electrode plate transfer unit that sequentially picks up and rotates the positive electrode plates transferred to the first transfer position and a second electrode plate transfer unit that sequentially picks up and rotates the negative electrode plates transferred to the second transfer position in such a manner that the predetermined time difference is maintained.

6. The secondary battery manufacturing equipment of claim 5, wherein a rotation angle range of the first electrode plate transfer unit and the second electrode plate transfer unit is set to 180 degrees.

7. The secondary battery manufacturing equipment of claim 5, wherein the first electrode plate transfer unit includes a first transfer arm formed in a vertically inverted "L" shape and forming a first central shaft, a pair of first grippers installed on both ends of the first transfer arm for sequentially picking up the positive electrode plates transferred to the first transfer position and transferring them to the stacking position, and a first rotator connected to the first central shaft for repeatedly rotating the first transfer arm within a rotation range of 180 degrees under the control of the control unit,
the second electrode plate transfer unit includes a second transfer arm formed in an "L" shape and forming a second central shaft, a pair of second grippers installed on both ends of the second transfer arm for sequentially picking up the negative electrode plates transferred to the second transfer position and transferring them to the stacking position, and a second rotator connected to the second central shaft for repeatedly rotating the second transfer arm within a rotation range of 180 degrees under the control of the control unit, and each of the positive electrode plates and each of the negative electrode plates are positioned such that they are sequentially stacked at the stacking position with the time difference.

8. The secondary battery manufacturing equipment of claim 7, wherein the first transfer arm and the second transfer arm are arranged to be symmetrical to each other in standby state before rotation.

9. The secondary battery manufacturing equipment of claim 7, wherein each of both ends of the first transfer arm defines a rotation range of 90 degrees, as the first transfer arm rotates, the first transfer arm sequentially transfers the positive electrode plates, which have been transferred to the first transfer position, to a first temporary transfer position by using any one of the pair of first grippers that is installed on one end of the first transfer arm, the positive electrode plates, which have been transferred to the first temporary transfer position, are sequentially transferred to the stacking position by using the other one of the pair of first grippers that is installed on the other end of the first transfer arm, each of both ends of the second transfer arm defines a rotation range of 90 degrees, as the second transfer arm is rotated, the second transfer arm sequentially transfers the negative electrode plates, which have been transferred to the second transfer position, to a second temporary transfer position by using any one of the pair of second grippers that is installed on one end of the second transfer arm, and the negative electrode plates, which have been transferred to the second temporary transfer position, are sequentially transferred to the stacking position by using the other one of the pair of second grippers that is installed on the other end of the second transfer arm.

10. The secondary battery manufacturing equipment of claim 1, wherein the defined distance along the first direction is a half of the first distance range and the defined distance along the second direction is a half of the first distance range.

11. The secondary battery manufacturing equipment of claim 10, wherein the separator supply unit includes a separator feeder for supplying the separator, a moving roller device which is, under the control of the control unit, disposed above the stacking plate and horizontally reciprocated in the second distance range and guides the supplied separator to be in close contact with an upper surface of the positive electrode plate that is moved along the first direction, and a separator guide for guiding the separator supplied from the separator feeder to the moving roller device.

12. The secondary battery manufacturing equipment of claim 11, wherein the moving roller device includes a first roller device installed in the main body unit so as to be positioned above the stacking plate and configured to supply the supplied separator and a second roller device interposed between the first roller device and the stacking plate and configured to guide the separator while reciprocating within the second distance range, wherein, when the positive electrode plate is loaded onto the stacking plate, the control unit moves the second roller device a distance equal to a half of the second distance range along the second direction to supply the separator onto the upper surface of the positive electrode plate, and when the negative electrode plate is loaded onto the stacking plate, the control unit moves the second roller device a distance equal to a half of the second distance range along the first direction opposite to the second direction to supply the separator onto the upper surface of the negative electrode plate.

13. The secondary battery manufacturing equipment of claim 12, wherein a pair of mandrel members are provided on both ends of the second roller device for temporarily fixing the separator supplied from an upper portion of both ends of the stacking plate.

14. The secondary battery manufacturing equipment of claim 11, wherein the separator guide includes a plurality of guide rollers for guiding the separator moved along a set movement path at a plurality of positions and a tension former for forming a predetermined tension on the separator.

15. The secondary battery manufacturing equipment of claim 14, wherein the tension former includes at least one of a pair of dancer rollers that guide the movement of the separator and are moved in directions that cross each other along a horizontal direction and a buffer roller that guides the movement of the separator and is moved up and down.

16. The secondary battery manufacturing equipment of claim 4, wherein a foreign material removal unit for forcibly removing foreign materials formed on the positive electrode plates or the negative electrode plates to be transferred is disposed on the first linear transfer unit and the second linear transfer unit, wherein the foreign material removal unit forcibly removes the foreign materials by supplying vacuum or compressed air.

17. The secondary battery manufacturing equipment of claim 10, wherein the stacking unit further includes a vision unit, wherein the vision unit includes an absorber for vacuum-absorbing a pair of corners of each of the electrode plates loaded at a pair of corners in a diagonal direction of the stacking plate, and a camera for acquiring top surface images of the vacuum-absorbed electrode plates and transmitting the acquired top surface images to the control unit, and the control unit determines whether or not the top surface images matches a preset alignment image, and thereby determines the quality of alignment.

18. The secondary battery manufacturing equipment of claim 17, wherein a tab in the shape of a rectangular plate is formed on each of the electrode plates and another camera that acquires an image of the tab and transfers the image to the control unit is disposed above the stacking plate, wherein the control unit calculates horizontal length values of the tab along a horizontal direction through the image of the tab, calculates vertical length values at both sides of the tab along a vertical direction, calculates intersection position values of the calculated horizontal length values and the vertical length values, calculates position values of corners at both ends of the tab through the intersection position values, calculates a distance between the calculated position values, compares the calculated distance with a preset normal distance, and, when the calculated distance is different from the preset normal distance, determines that the tab is defective.

19. The secondary battery manufacturing equipment of claim 18, wherein, when the vertical lengths exceed a preset error range, the control unit determines that the tab is defective.

* * * * *